US006616875B2

(12) United States Patent
Lee et al.

(10) Patent No.: US 6,616,875 B2
(45) Date of Patent: Sep. 9, 2003

(54) MANUFACTURING METHOD FOR A METAL OXIDE ELECTRODE FOR SUPERCAPACITOR

(75) Inventors: Hee-young Lee, Seoul (KR); Heui-soo Kim, Seoul (KR); Woo-kyeong Seong, Kyonggi-Do (KR); Sun-wook Kim, Seoul (KR)

(73) Assignee: Ness Capacitor Co., Ltd., Suwon-si (KR)

( * ) Notice: Subject to any disclaimer, the term of this patent is extended or adjusted under 35 U.S.C. 154(b) by 0 days.

(21) Appl. No.: 09/971,652

(22) Filed: Oct. 9, 2001

(65) Prior Publication Data

US 2002/0036885 A1 Mar. 28, 2002

Related U.S. Application Data

(62) Division of application No. 09/514,366, filed on Feb. 28, 2000, now Pat. No. 6,339,528.

(30) Foreign Application Priority Data

Sep. 16, 1999 (KR) ............................................. 99-39888
Sep. 16, 1999 (KR) ............................................. 99-39898
Sep. 16, 1999 (KR) ............................................. 99-39899

(51) Int. Cl.[7] ...................... B29C 70/88; B29C 43/02; C25B 11/12; C25B 11/16
(52) U.S. Cl. ...................... 264/105; 264/104; 264/128; 264/140; 361/502; 361/503
(58) Field of Search ................. 361/502, 503, 361/504; 428/469; 264/104, 105, 119, 122, 128, 140, 162, 611, 612, 614, 615, 678, 681

(56) References Cited

U.S. PATENT DOCUMENTS

| 4,094,951 A | * | 6/1978 | Ishikawa et al. ............. 264/325 |
| 4,161,063 A | * | 7/1979 | Goebel et al. .............. 29/623.5 |
| 4,292,197 A | * | 9/1981 | Chamberlin ................. 502/101 |
| 4,396,253 A | * | 8/1983 | Kuwagaki et al. .......... 359/269 |
| 4,892,637 A | * | 1/1990 | Sauer et al. ................. 204/291 |
| 5,429,893 A | * | 7/1995 | Thomas ..................... 429/333 |
| 5,435,874 A | * | 7/1995 | Takeuchi et al. ............ 156/242 |
| 5,955,215 A | * | 9/1999 | Kurzweil et al. ............. 429/41 |
| 5,982,609 A | * | 11/1999 | Evans ........................ 361/516 |
| 6,094,338 A | * | 7/2000 | Hirahara et al. ............ 361/502 |
| 6,325,742 B1 | * | 12/2001 | Lee ............................. 477/116 |
| 6,339,528 B1 | * | 1/2002 | Lee et al. .................... 361/502 |
| 6,358,447 B1 | * | 3/2002 | Horst-Udo .................. 264/105 |
| 6,464,617 B1 | * | 10/2002 | Lee ............................. 477/154 |
| 6,496,357 B2 | * | 12/2002 | Lee et al. .................... 361/503 |
| 6,510,042 B1 | * | 1/2003 | Lee et al. .................... 361/502 |

* cited by examiner

Primary Examiner—Angela Ortiz
(74) Attorney, Agent, or Firm—Jacobson Holman PLLC

(57) ABSTRACT

A metal oxide electrode for a supercapacitor and a manufacturing method thereof are disclosed. Potassium permanganate is absorbed on a conductive material, such as carbon or activated carbon, and mixed with a solution including manganese acetate so as to form amorphous manganese oxide. Amorphous manganese oxide powder is grounded to a powder which is mixed with binder to form an electrode having a predetermined shape. The electrode reduces equivalent serial resistance and enhances high frequency characteristics since the contact area and the adhesion strength between the manganese oxide and the conductive carbon are improved. Also, the electrode has high capacitance suitable for a supercapacitor, which is manufactured therefrom at a greatly reduced cost.

15 Claims, 22 Drawing Sheets

MANUFACTURING METHOD FOR A METAL OXIDE ELECTRODE FOR SUPERCAPACITOR

This is a divisional application of prior application Ser. No. 09/514,366 filed Feb. 28, 2000, now U.S. Pat. No. 6,339,528.

BACKGROUND OF THE INVENTION

1. Field of the Invention

The present invention relates to a metal oxide electrode for a supercapacitor and a method for manufacturing the same, and more particularly to a metal oxide electrode for a supercapacitor including manganese oxide as an active material of the electrode, and a method for manufacturing the same.

2. Description of the Related Art

The recent advancement of scientific civilization accelerates the use of various high technology electronic devices. These devices are essential for modern life, but such devices produce many environmental problems, such as increasing waste and pollution. Considering those problems, a great deal of effort has been expended to develop an alternative energy storing device having high capacity and long durability without pollution. Also, the need for memory devices which can conveniently control various electronic devices has rapidly increased.

Because of the problem that most electronic devices are subject to memory loss, thus causing errors, when an undesired stoppage or even a variation of power occurs, the need for memory back up power continually increases. To meet such need, much research has been undertaken. One of the best solutions of recent research is development of an electrochemical capacitor, which is called a supercapacitor. It has a greatly enhanced storage capacitance which is more than hundreds to thousands of times larger than that of conventional capacitors. Also, the supercapacitor has high energy density and excellent power density which is hundreds of times more than the power density of a battery, thereby providing much stable and powerful energy to electronic devices.

The electrochemical capacitor is generally divided into three categories, such as an Electric Double Layer Capacitor (EDLC), a metal oxide pseudocapacitor and a conducting polymer capacitor, depending on the energy storage mechanism and active materials used in each system. In the metal oxide pseudocapacitor, the active material is generally conductive metal oxide which has high surface area and electrochemical reactivity with working ions in an electrolyte. Electrochemical reduction and oxidation reactions as well as physical charge separation between an electrode and electrolyte interface, are the energy storage mechanisms. On the other hand, the EDLC uses activated carbon with a large surface area as an active material, and physical charge separation between an electrode and an electrolyte interface is the main energy storage mechanism.

It is generally appreciated that the metal oxide pseudocapacitor can obtain higher capacitance than the EDLC because, as mentioned above, the metal oxide pseudocapacitor can get its capacitance using an electrochemical redox reaction as well as the physical charge separation at the electrolyte interface, whereas the EDLC system only obtains its capacitance from the physical charge separation at the electrolyte interface.

The supercapacitor generally consists of porous active material electrodes, a separator, an electrolyte, a current collector, a case and terminals. The current collector can be composed of high electrical conductivity material, such as metal or a conducting film. The case and the terminals should be composed of light materials to reduce the weight of the capacitor. The separator and the electrolyte relate to the ionic conductivity of the capacitor. The current collector and the terminals are concerned with electrical conductivity of the capacitor. The electrical and the ionic conductivities are the main factors in determining the output characteristics of the capacitor.

The manganese oxide with layered structure can be a candidate for an electrode of the metal oxide pseudocapacitor, which has been studied as an electrode of rechargeable batteries. The manganese oxide, including layered structure having potassium ions therein, is obtained by thermally decomposing potassium permanganate or chemical reactions.

The reaction of the supercapacitor is a surface reaction, while the reaction of the manganese oxide is an intercalation reaction. Thus, such manganese oxide may not be applied to the electrode of the supercapacitor because the supercapacitor has a rapidly charging/discharging, wide permissible temperature range and high electrical conductivity. But, depending on a condition of material synthesis, such as cooling rate, surface condition as a mean valence of manganese ion of material can be changed to show good capacitor performance. Moreover, intercalation reaction also may contribute to the total capacitance of the material in special capacitor operation, such as slow charge and discharge conditions.

Ruthenium oxide ($RuO_2$) has recently been utilized as an electrode of a capacitor. The capacitor using ruthenium oxide as an electrode has a high capacitance of about 700 F/g, which is much higher than that of conventional capacitors. However, ruthenium oxide is too expensive to apply to the capacitor electrodes, i.e., the manufacturing cost of a ruthenium oxide electrode is hundreds of times higher than that of a conventional electrode. Furthermore, the high capacitance of ruthenium oxide can be obtained only when an acid solution, such as that of sulfuric acid ($H_2SO_4$), is used therewith, which causes a serious environmental hazard.

The present inventors reported that amorphous manganese oxide has good properties as an electrode for a supercapacitor in a neutral electrolyte, such as potassium chloride (refer to *Journal of Solid State Chemistry*. vol. 144, pages 220 to 223, 1999, entitled "SUPERCAPACITOR BEHAVIOR WITH KCl ELECTROLYTE"). However, when amorphous manganese oxide is directly used as the electrode of a supercapacitor, the Equivalent Serial Resistance (ESR) of the supercapacitor may be greatly increased when operating at a high frequency, and the energy loss of the supercapacitor may be seriously increased at a low frequency because amorphous manganese oxide has low conductivity at room temperature.

Although the electrode for the supercapacitor is manufactured by physically mixing conductive carbon having good electrical conductivity with amorphous manganese oxide, the increasing capacitance of the supercapacitor and the reducing volume of the supercapacitor may be limited since little manganese oxide can be included in conductive carbon by specific volume. Also, the physical mixing process has some disadvantages; the contact area between the manganese oxide and the conductive carbon is reduced, and the degree of dispersion of the manganese is limited.

SUMMARY OF THE INVENTION

Considering the above-described problems and disadvantages, it is an object of the present invention to provide a metal oxide electrode for a supercapacitor having high capacitance.

It is another object of the present invention to provide a method for manufacturing a metal oxide electrode for a supercapacitor having high capacitance.

It is still another object of the present invention to provide a metal oxide electrode for a supercapacitor having a low ESR and an enhanced high frequency characteristic in a neutral electrolyte.

It is still another object of the present invention to provide a method for manufacturing a metal oxide electrode for a supercapacitor having a low ESR and an enhanced high frequency characteristic in a neutral electrolyte.

To achieve these objects, the present invention provides a metal oxide electrode comprising manganese oxide powder, conductive material and binder.

Preferably, the binder is composed of or comprises polytetrafluoroethylene.

According to one embodiment of the present invention, the conductive material is conductive carbon and the manganese oxide powder is coated on the conductive carbon. As for the present invention, many kinds of highly conductive materials can replace the conductive carbon because the roles of the conductive carbon of the present invention are making an electrical conduction path and sites of the amorphous manganese oxide coating. Therefore, basically all conductive materials, such as metal oxide, metal nitride, metal carbide, metal powder and conducting polymer, are suitable for this purpose.

Preferably, the electrode comprises from approximately 20 to 80% by weight of conductive carbon.

According to the another embodiment of the present, the conductive material is an activated carbon and the manganese oxide powder is coated in pores of the activated carbon and on the surface of the activated carbon.

Preferably, the electrode comprises from approximately 20 to 80% by weight of the activated carbon. In this case, the activated carbon preferably has a specific surface area of from approximately 1500 to 3000 $m^2/g$.

In another embodiment of the present invention, the conductive material is also a conductive carbon and the manganese oxide powder is coated on the conductive carbon. In this case, the electrode preferably includes from approximately 30 to 90% by weight of the manganese oxide powder, from approximately 5 to 50% by weight of the conductive carbon and from approximately 5 to 50% by weight of binder.

Also, to accomplish the above objects of the present invention, there is provided a method for manufacturing a metal oxide electrode for a supercapacitor comprising steps of: forming a conductive material solution by dispersing a conductive material in deionized water; forming a first solution by adding potassium permanganate to the conductive material solution; forming a second solution comprising manganese acetate; forming amorphous manganese oxide by mixing the first solution with the second solution; and forming the metal oxide electrode including the amorphous manganese oxide.

According to one embodiment of the present invention, the step of forming the conductive material solution is performed after dissolving a surfactant in the deionized water. At that time, the surfactant is preferably composed of polyvinylpyrrolidone.

In another embodiment of the present invention, the conductive material is conductive carbon or activated carbon, and the first solution is a potassium permanganate solution, wherein the potassium permanganate is absorbed into the conductive material.

Preferably, the step of forming the metal oxide electrode includes substeps of extracting amorphous manganese oxide powder from the first solution and the second solution, grinding the amorphous manganese oxide powder, forming a mixture by adding binder to the ground amorphous manganese oxide powder and forming an electrode having a predetermined shape by using the mixture.

The step of extracting the amorphous manganese oxide powder preferably includes substeps of filtering the amorphous manganese oxide powder from a mixture of the first solution and the second solution, washing the filtered amorphous manganese oxide powder and drying the washed amorphous manganese oxide powder. In this case, the binder is composed of polytetrafluoroethylene.

According to another embodiment of the present invention, there is provided a method for manufacturing a metal oxide electrode for a supercapacitor comprising steps of: grinding potassium permanganate; heating a furnace at a first predetermined temperature; thermally decomposing the ground potassium permanganate in the furnace; quenching the product to a second predetermined temperature; washing and filtering the product; and mixing the product with conductive material, binder and solution.

Preferably, the furnace is heated to a temperature of from approximately 450 to 550° C. and the step of thermally decomposing the ground potassium permanganate is performed to form manganese oxide having a layer structure and comprising potassium ions therein.

The step of quenching the product is performed by rapidly cooling the product to a temperature below room temperature. In this case, the conductive material is conductive carbon and the binder is composed of polytetrafluoroethylene.

In one method for manufacturing a metal oxide electrode for a supercapacitor according to a preferred embodiment of the present invention, a surfactant is sufficiently dissolved in deionized water, and then conductive carbon is dispersed in the deionized water (including the surfactant) to form a conductive carbon solution. After the conductive carbon is sufficiently dispersed in the conductive carbon solution, potassium permanganate ($KMnO_4$) is added to the conductive carbon solution and is absorbed on the surface of the conductive carbon, thereby forming a potassium permanganate solution. Amorphous manganese oxide ($MnO_2 \cdot nH_2O$) is prepared by mixing the potassium permanganate solution with a manganese acetate solution. Amorphous manganese oxide powder is extracted from the mixed solution through filtering, washing and drying processes. The amorphous manganese oxide powder is ground and mixed with binder to form a mixture. Then, the mixture is formed to manufacture an electrode for a supercapacitor having a predetermined shape. In this case, the electrode comprises from approximately 20 to 80 weight percent (wt %) of the conductive carbon.

As for another method for manufacturing a metal oxide electrode for a supercapacitor according to another preferred embodiment of the present invention, an activated carbon powder is sufficiently dispersed in deionized water to form an activated carbon solution, and then potassium permanganate is added to the activated carbon solution, thereby forming potassium permanganate solution including the potassium permanganate absorbed in pores of the activated carbon and on the surface of the activated carbon. An electrode for a supercapacitor is manufactured according to the above described method after amorphous manganese oxide is formed by mixing the potassium permanganate solution with a manganese acetate solution. In this case, the activated carbon has a specific surface area of from approximately 1500 to 3000m²/g. The electrode comprises from approximately 20 to 80 wt % of the activated carbon. Preferably, the activated carbon has a specific surface area of approximately 2000m²/g, and the electrode is composed of appxomimately 40 wt % of the activated carbon.

In another method for manufacturing a metal oxide electrode for a supercapacitor according to a further preferred embodiment of the present invention, after potassium permanganate is inserted into a furnace previously heated to a predetermined temperature, the potassium permanganate is thermally decomposed in the furnace, and then rapidly cooled below room temperature to form a manganese oxide powder. Such manganese oxide powder has stable chemical structure and composition since the crystal and the particle growths in the manganese oxide powder can be limited during slow heating and slow cooling processes. The thermal decomposition reaction of the potassium permanganate proceeds as the following expression.

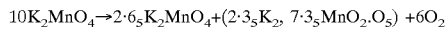

$$10K_2MnO_4 \rightarrow 2\cdot6_5K_2MnO_4 + (2\cdot3_5K_2, 7\cdot3_5MnO_2.O_5) + 6O_2$$

wherein the subscripts 5 mean significant figures.

The temperature of the furnace is from approximately 450 to 550° C. during the thermal decomposition reaction. Preferably, the thermal decomposition reaction proceeds at temperature of approximately 500° C.

If the thermal decomposition reaction occurs below 450° C., manganese oxide cannot be obtained since the thermal decomposition reaction begins only above 450° C. Also, surface conditions of the manganese oxide, including mean valence of manganese ion, are not adequate to yield good capacitance when the thermal decomposition reaction occurs above 650° C.

FIG. 1 is a graph showing X-ray diffraction analysis of the manganese oxide powder according to a preferred embodiment of the present invention. Such manganese oxide is manufactured by washing the thermally decomposed potassium permanganate with distilled water and drying it at 120° C. after the potassium permanganate is thermally treated at approximately 500° C. for approximately 2 hours and rapidly cooled to room temperature.

Referring to FIG. 1, the manganese oxide powder of the present invention has nearly a delta (δ) phase as the layered structure.

FIG. 2 is a graph showing particle size distribution of the manganese oxide powder in FIG. 1. As shown in FIG. 2, most of the particles of the manganese oxide powder have diameters of from approximately 0.1 to 1.0 μm.

FIG. 3 is a graph illustrating measured capacitances of manganese oxide powders respectively prepared at various temperatures according to another preferred embodiments, and FIG. 4 is a graph illustrating unit capacitances of the manganese oxide powders respectively manufactured for various reaction times according to another preferred embodiments. In FIG. 4, the thermal decomposition reactions occur at approximately 500° C.

Referring to FIGS. 3 and 4, the manganese oxide powder manufactured at 500° C. for 2 hours has the highest specific capacitance.

When the manganese oxide having layered structure is applied to the electrode for the supercapacitor, the conductive material, such as the conductive carbon, is mixed with the manganese oxide since the manganese oxide having the layered structure has relatively low electrical conductivity. Otherwise, the energy of the capacitor may reduce when the capacitor is operated at low frequency. Also, the binder is added to the conductive material having the manganese oxide coated thereon for coating the mixture on a current collector to have a film shape. If the electrode comprises below 30 wt % of the manganese oxide or above 80 wt % of the conductive material, the electrode cannot have proper characteristics for the supercapacitor. When the electrode comprises above 90 wt % of the manganese oxide or below 5 wt % of the conductive material, the ESR of the electrode increases, so the capacitor having such an electrode may operate only with difficulty at a high frequency or at a low frequency. In addition, the mixture cannot be coated on the current collector when the electrode comprises below 5 wt % of the binder and the electrode may not be applied to the supercapacitor when the electrode includes above 50 wt % of the binder. The electrode of the present invention has a high capacitance of approximately 300 F/g in case of a water-soluble electrolyte.

According to the present invention, the electrode for the supercapacitor can reduce the ESR and enhance high frequency characteristics since the contact area and the adhesion strength between the manganese oxide and the conductive carbon are improved.

Also, the electrode of the present invention has high capacitance suitable for a supercapacitor as compared with conventional electrodes because the electrode is manufactured by mixing amorphous manganese oxide powder with the conductive material and the binder.

Furthermore, the electrode of the present invention can be manufactured at a cost of one percent of that of the ruthenium oxide electrode, even though the electrode of the present invention has good capacitance nearly equal to half the capacitance of the ruthenium oxide electrode which has the highest capacitance among conventional electrodes.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE INVENTION

Figure 1:
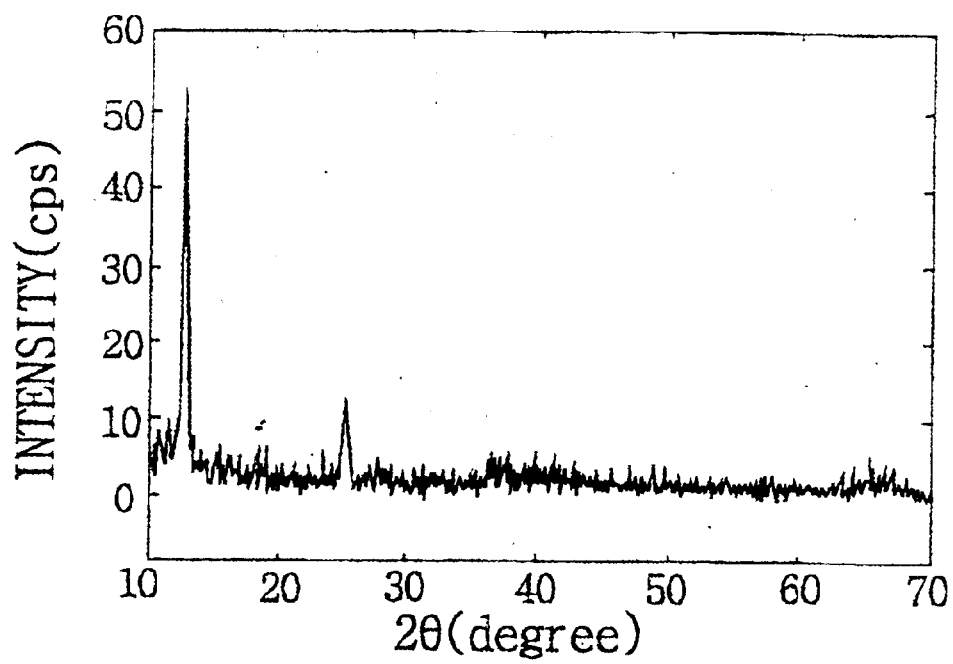
FIG. 1 is a graph showing X-ray diffraction analysis of manganese oxide according to a preferred embodiment of the present invention.
Figure 2:
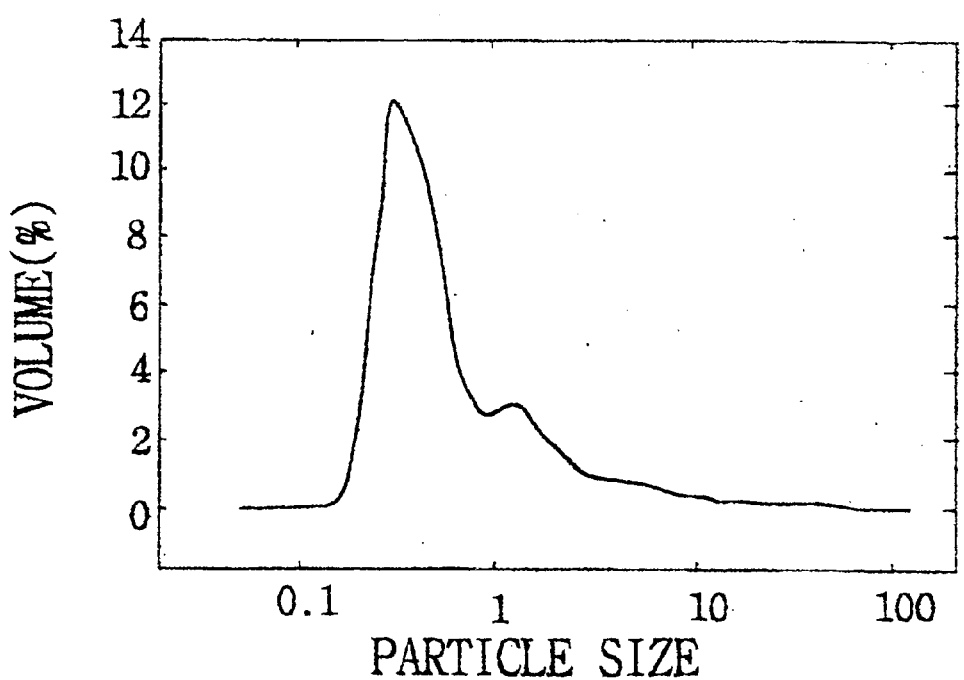
FIG. 2 is a graph showing particle distribution of manganese oxide in FIG. 1.
Figure 3:
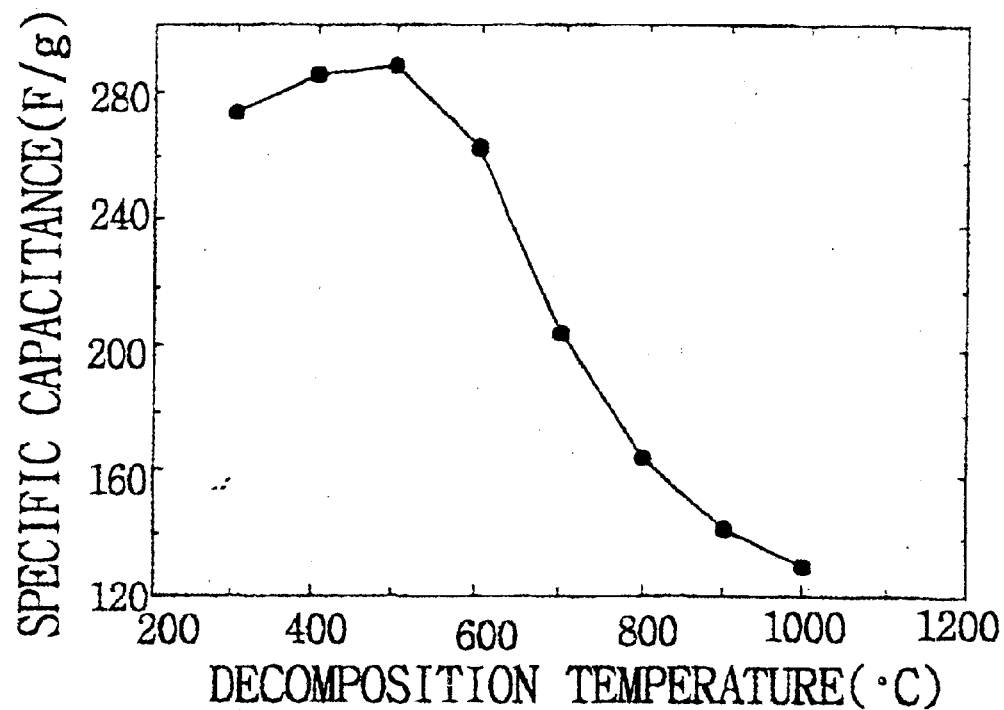
FIG. 3 is a graph illustrating measured capacitances of manganese oxide powders respectively prepared at various temperatures according a preferred embodiment of the present invention.
Figure 4:
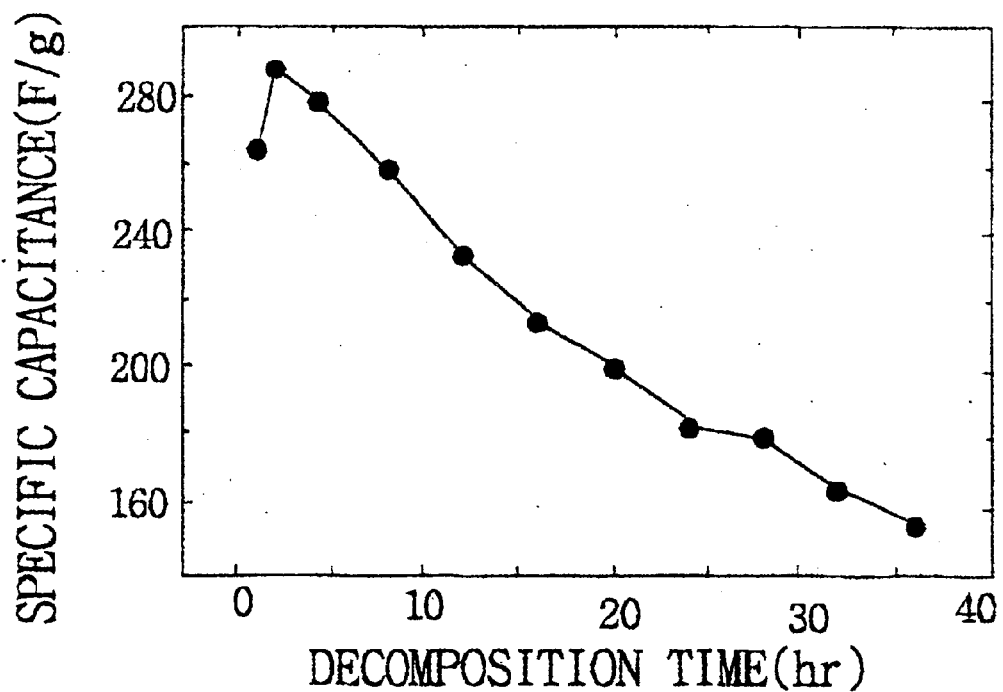
FIG. 4 is a graph illustrating specific capacitances of manganese oxide powders respectively manufactured for various reaction times according a preferred embodiment of the present invention.
Figure 5A:
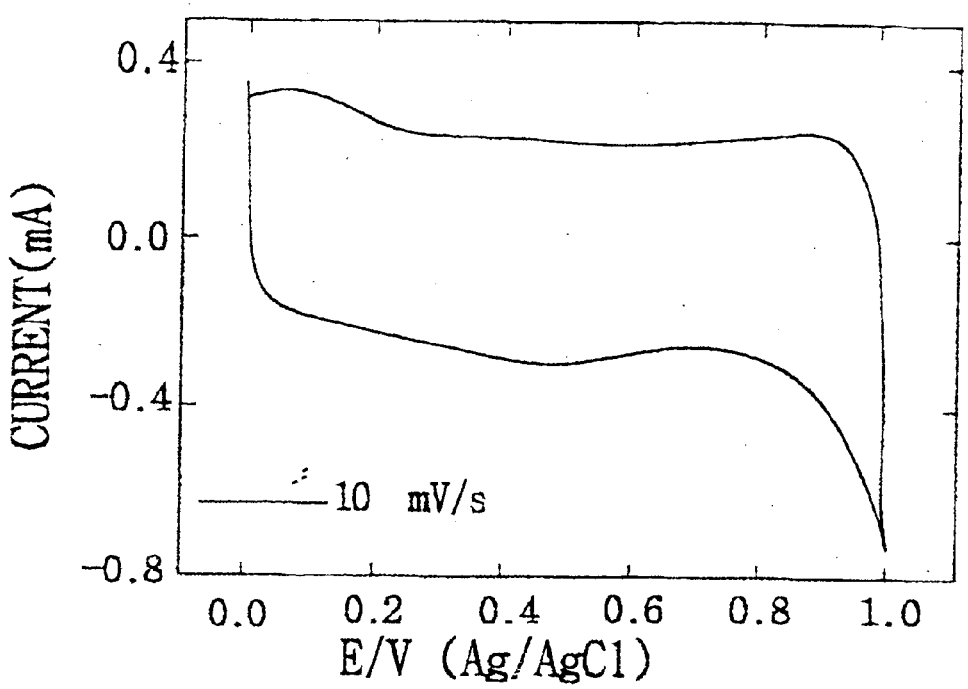
FIG. 5A to FIG. 5F are graphs showing cyclic voltammograms (CV) of an electrode for a supercapacitor measured by changing voltage scanning speeds according to the first experiment of the present invention.
Figure 5B:
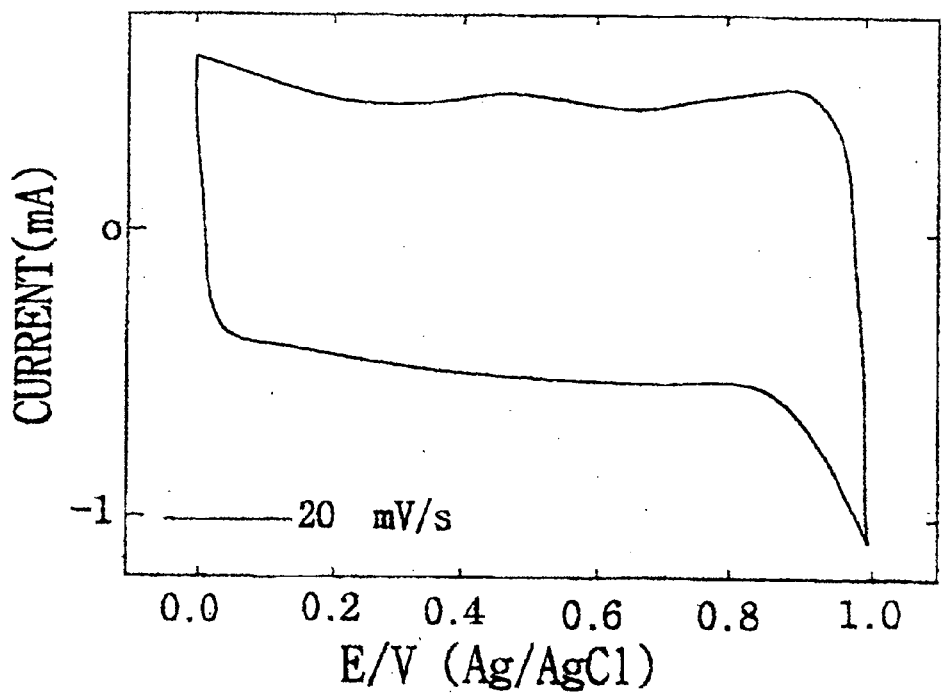
Figure 5C:
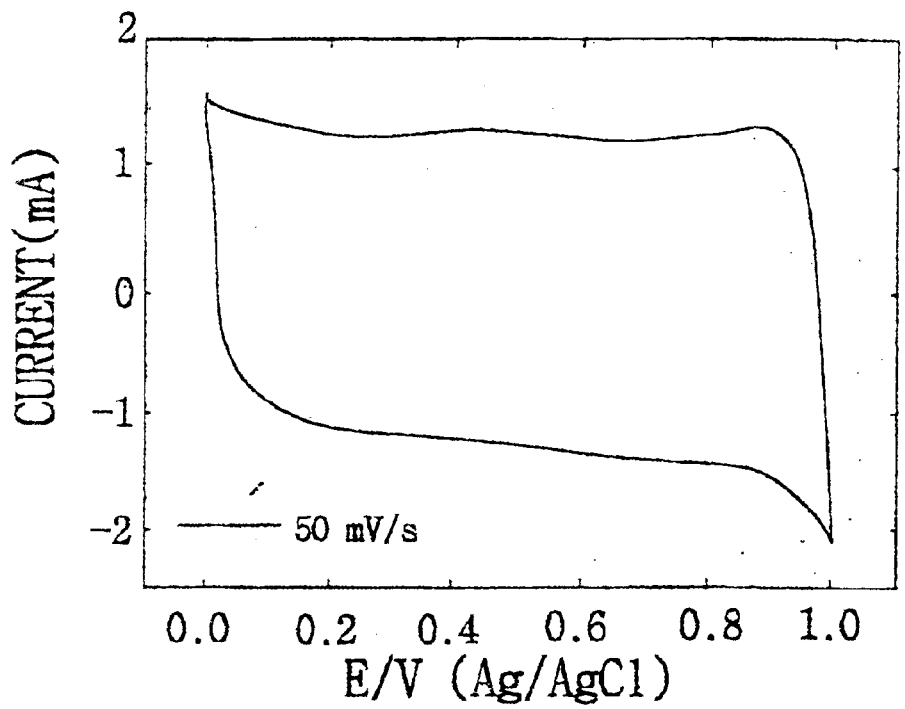
Figure 5D:
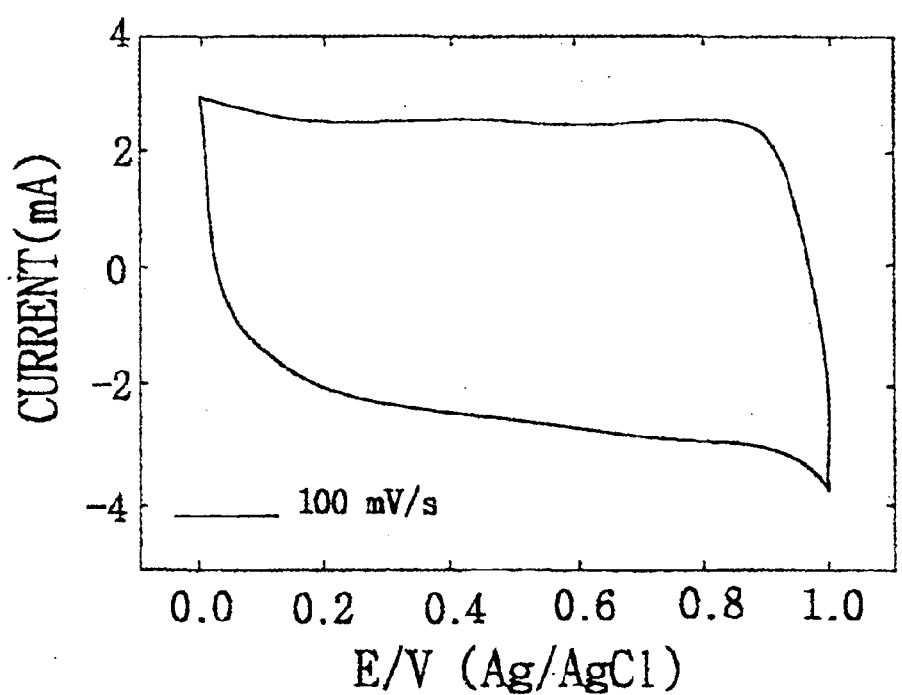
Figure 5E:
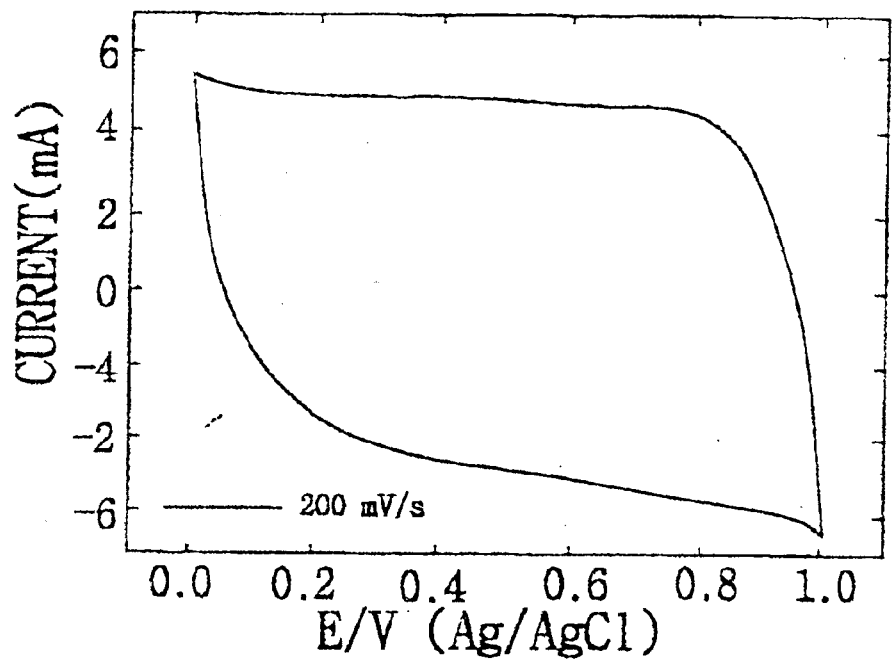
Figure 5F:
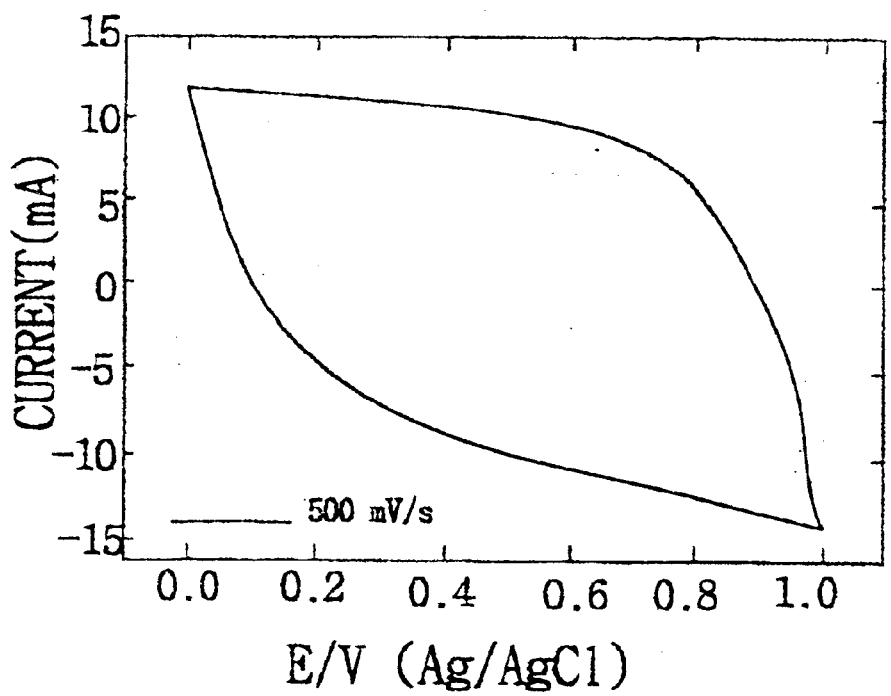
Figure 6A:
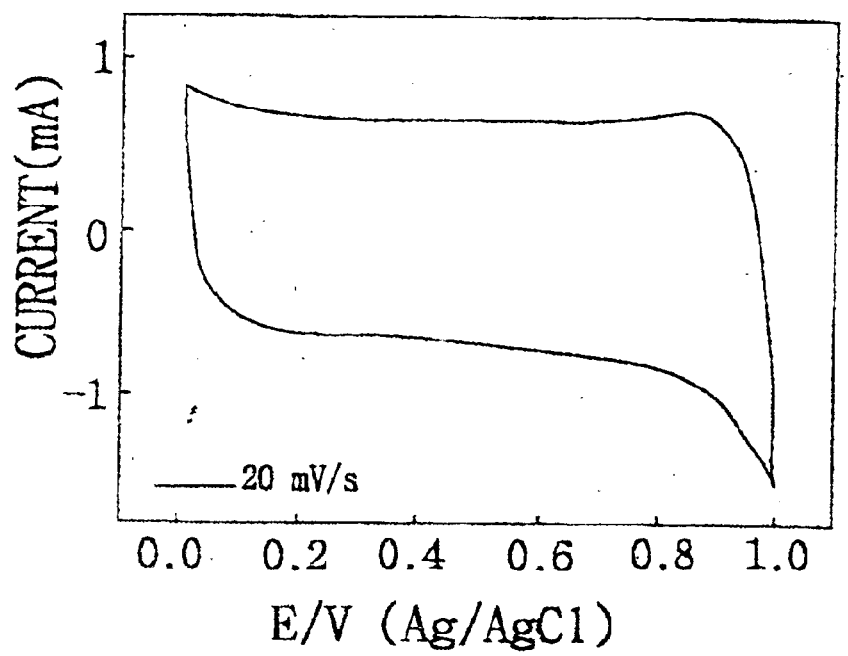
FIG. 6A to FIG. 6D are graphs showing cyclic voltammograms of an electrode for a supercapacitor measured by changing voltage scanning speeds according to the second experiment of the present invention.
Figure 6B:
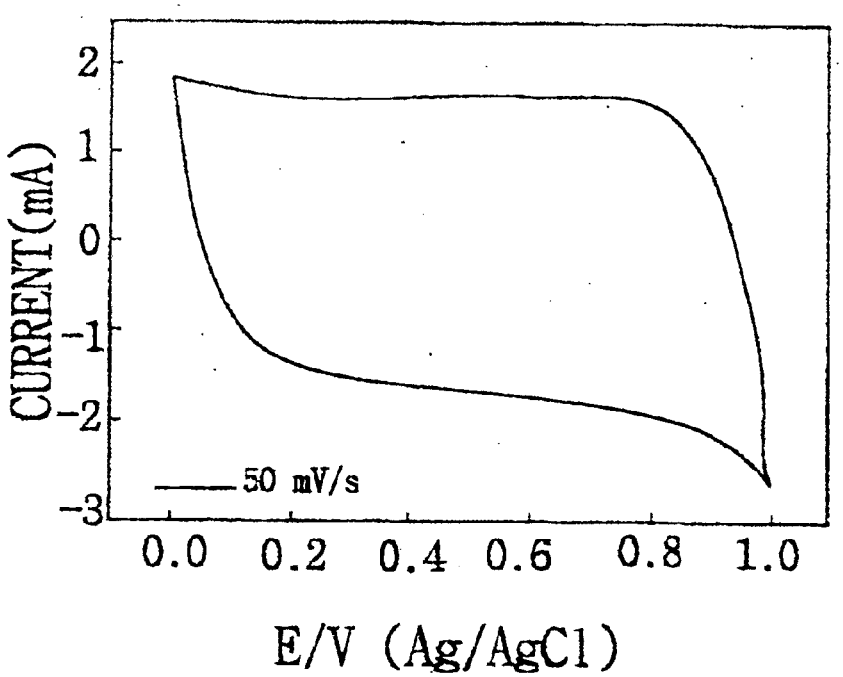
Figure 6C:
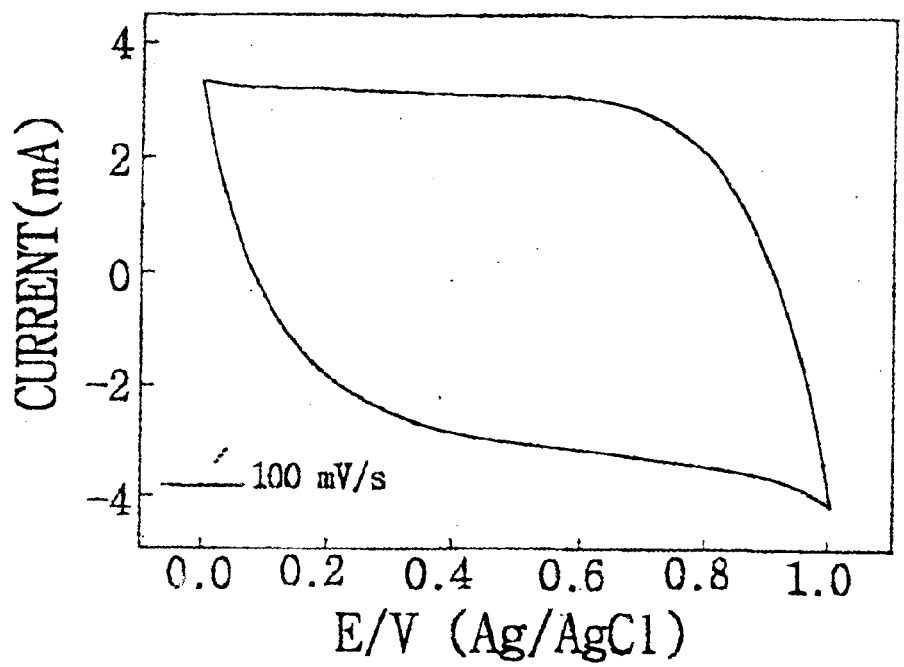
Figure 6D:
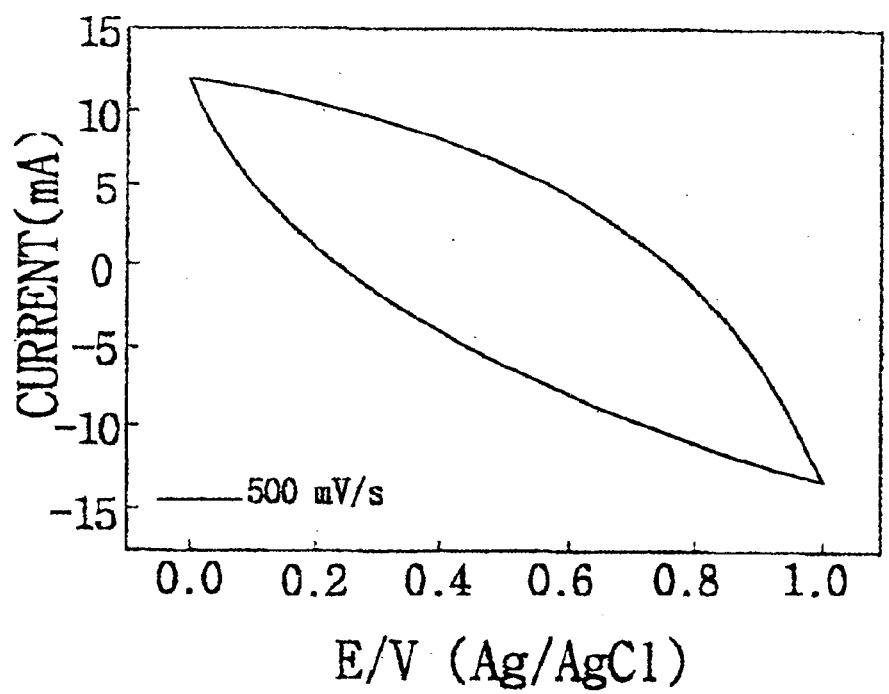
Figure 7A:
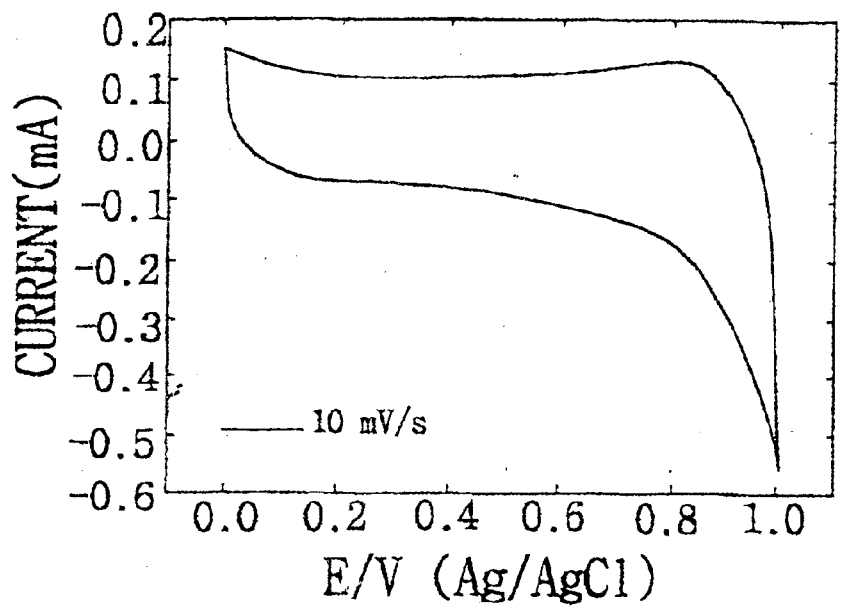
FIG. 7A to FIG. 7F are graphs showing cyclic voltammograms of an electrode for a supercapacitor measured by changing voltage scanning speeds according to the third experiment of the present invention.
Figure 7B:
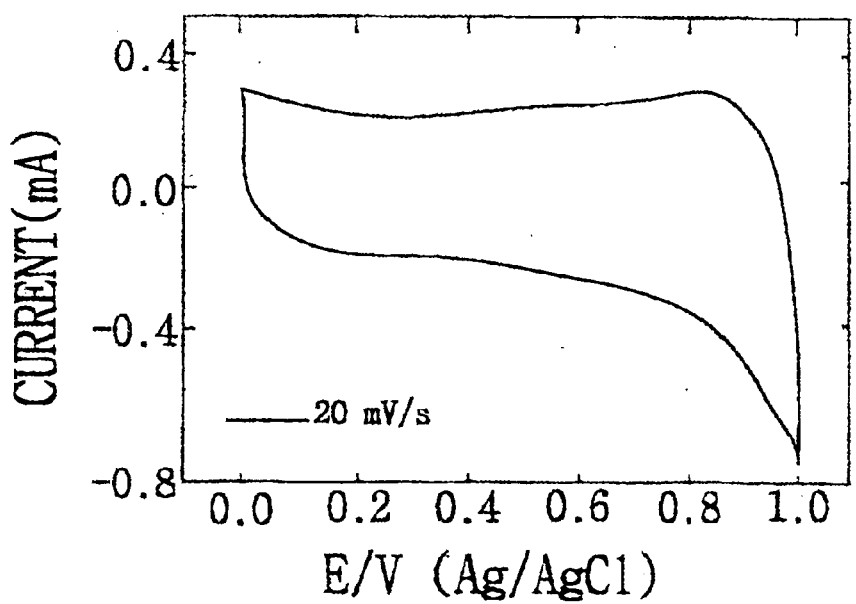
Figure 7C:
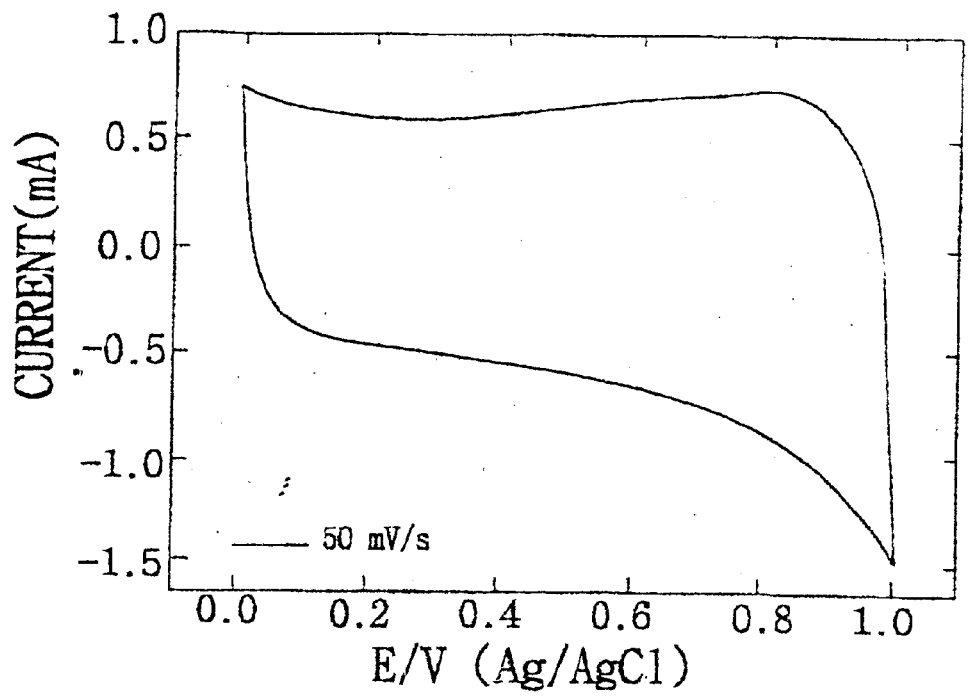
Figure 7D:
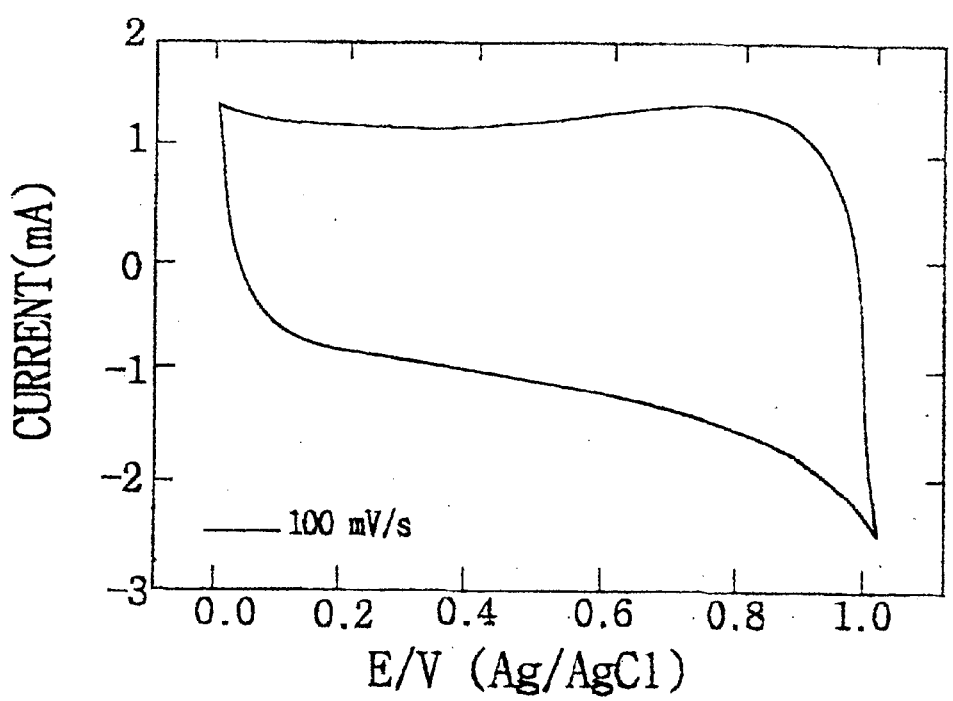
Figure 7E:
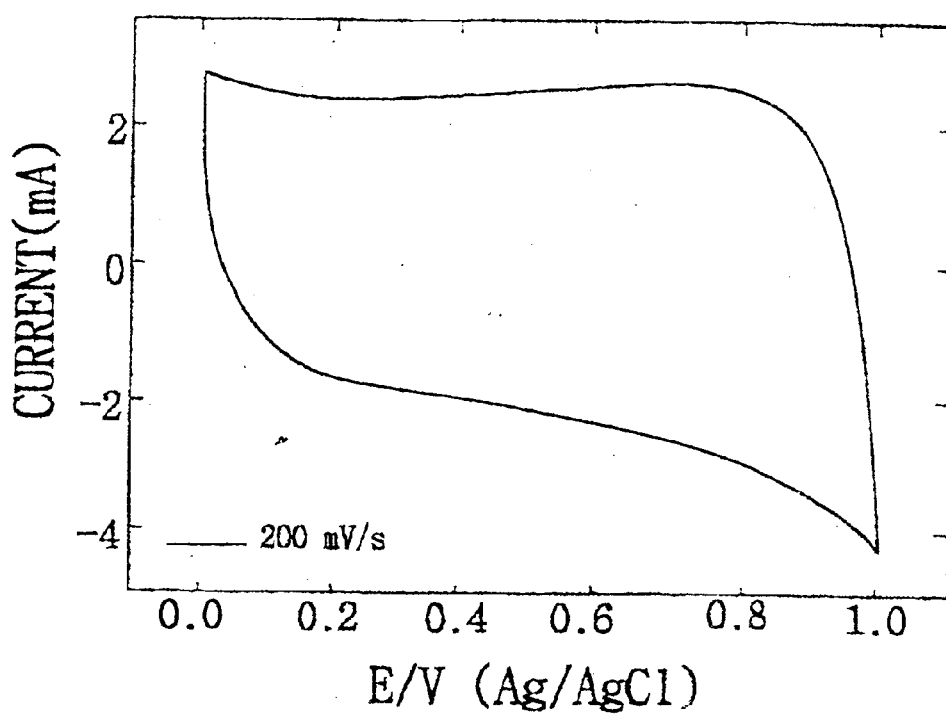
Figure 7F:
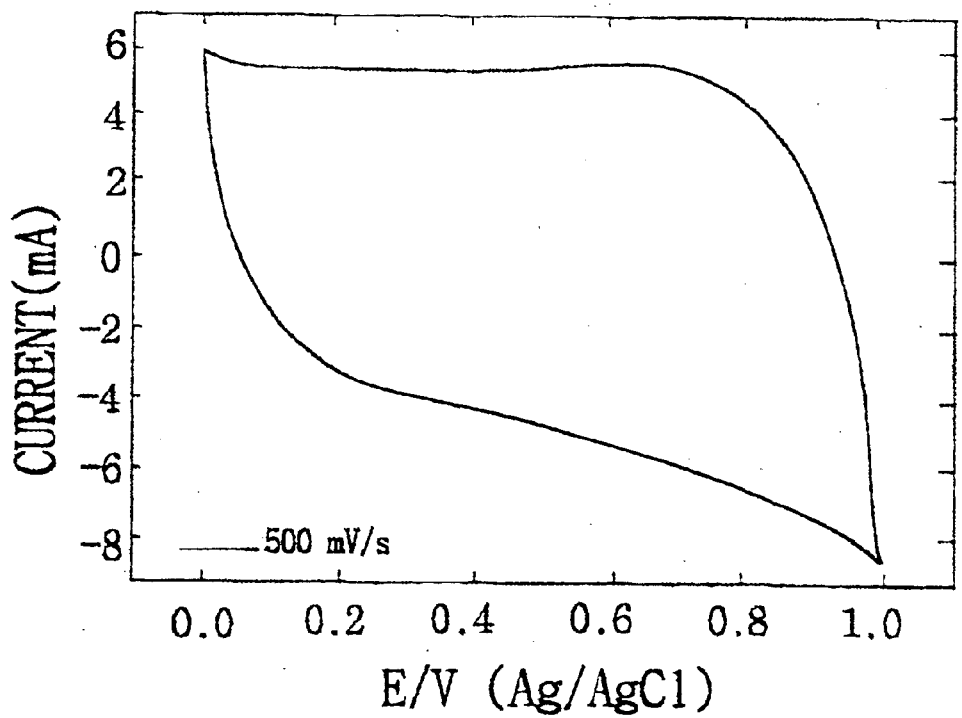

Hereinafter, various embodiments of the present invention will be explained in more detail with reference to the accompanying figures, however, it is understood that the present invention should not be limited to the following preferred embodiments.

Experiment 1

After a conductive carbon powder was added to 60 ml of deionized water, the conductive carbon powder was sufficiently dispersed and wetted in the deionized water by stirring the deionized water, including the conductive carbon, to form conductive carbon solution. In this case, a surfactant was previously dissolved in the deionized water in order to achieve complete dispersion of the conductive carbon powder because the particles of the conductive carbon powder are hydrophobic. When the surfactant may not be added to the deionized water, potassium permanganate cannot be absorbed in the conductive carbon powder in the subsequent step since the particles of the conductive powder are not sufficiently wetted by the deionized water.

In the present experiment, the conductive carbon was acetylene black manufactured by Chevron Chemical Company in the United States. In this case, the amount of the conductive carbon was 20 weight percent (wt %), 40 wt %, 60 wt % and 80 wt %, respectively. The amount of the conductive carbon was calculated on grounds of the total amount of the manganese oxide powder prepared by mixing potassium permanganate with manganese acetate during the subsequent steps. The surfactant was 0.06 g of polyvinylpyrrolidone (PVP).

Subsequently, permanganate solution was prepared by adding 1.58 g of potassium permanganate ($KMnO_4$) to the conductive carbon solution. Then, the permanganate solution was stirred for 1 hour so that the potassium permanganate was sufficiently absorbed on the conductive carbon.

Meanwhile, manganese acetate solution was prepared by adding 3.68 g of manganese acetate to 100 ml of deionized water.

The manganese acetate solution was mixed with the permanganate solution to form a mixed solution, and then the mixed solution was violently stirred. When the manganese acetate solution is mixed with the permanganate solution, the formation of amorphous manganese oxide rapidly proceeds so that the color of the mixed solution is quickly changed to brown, which is the color of the amorphous manganese oxide, and the viscosity of the mixed solution rapidly increases. Thus, the mixed solution was stirred for 12 hours in order to execute the formation reaction of the amorphous manganese oxide in the present experiment.

After the mixed solution including the amorphous manganese oxide was filtered several times by using a ceramic filter, thereby obtaining amorphous manganese oxide powder, the amorphous manganese oxide powder was washed with deionized water.

Then, the amorphous manganese oxide powder was sufficiently dried in a dryer at a temperature of 120° C. after the amorphous manganese oxide powder was inserted into the dryer.

After the sufficiently dried amorphous manganese oxide powder was ground, a mixture was formed by mixing binder with the ground amorphous manganese oxide powder. The binder was polytetrafluoroethylene (PTFE).

Subsequently, sheet shaped electrodes were cut to form pellet shaped electrodes after the sheet shaped electrodes were formed by rolling the mixture.

Finally, manganese oxide electrodes for the supercapacitor were manufactured by cold drawing the pellet shaped electrodes on current collectors.

FIG. 5A to FIG. 5F are graphs showing cyclic voltammograms (CV) of the electrode for the supercapacitor according to the present experiment. In FIGS. 5A to 5F, the cyclic voltammograms of the electrode for the supercapacitor were measured by changing voltage scanning speeds. In this case, the electrode for the supercapacitor includes 40 wt % of the conductive carbon.

Referring to FIGS. 5A to 5F, the electrode for the supercapacitor of the present experiment has excellent current responsibility and the charging/discharging of the electrode for the supercapacitor can be accomplished by a constant rate concerning the whole cycle.

Experiment 2

As for the present experiment, electrodes for the supercapacitor were manufactured by the method of experiment 1 except for the amount of conductive carbon in the electrodes for the supercapacitor.

According to the present experiment, the conductive carbon was SUPER-P manufactured by M.M.M. Carbon in Belgium, and the amount of the conductive carbon was 20 wt %, 40 wt %, 60 wt % and 80 wt %, respectively. In this case, the amount of the conductive carbon was evaluated on grounds of the total amount of the manganese oxide powder prepared by mixing the potassium permanganate with the manganese acetate.

FIG. 6A to FIG. 6D are graphs showing cyclic voltammograms (CV) of the electrode for the supercapacitor according to the present experiment. In FIGS. 6A to 6D, the cyclic voltammograms of the electrode for the supercapacitor were measured by changing voltage scanning speeds, and the electrode for the supercapacitor includes 60% by weight of the conductive carbon.

As shown in FIGS. 6A to 6D, the electrode for the supercapacitor of the present experiment has rapid current response, and the charging/discharging of the electrode can be accomplished by a constant rate concerning the whole cycles.

Experiment 3

In the present experiment, electrodes for the supercapacitor were manufactured by the method as that of experiment 1 except for the type of the conductive carbon and the amount of the conductive carbon in the electrodes for the supercapacitor.

According to the present experiment, the conductive carbon was Ketjen Black EC manufactured by Lion Corporation in Japan, and the amount of the conductive carbon was 20 wt %, 40 wt %, 60 wt % and 80 wt %, respectively.

FIG. 7A to FIG. 7F are graphs showing cyclic voltammograms (CV) of the electrode for the supercapacitor according to the present experiment. In FIGS. 7A to 7F, the cyclic voltammograms of the electrode for the supercapacitor were measured by changing voltage scanning speeds and the electrode for the supercapacitor includes 40% by weight of the conductive carbon.

As shown in FIGS. 7A to 7F, the electrode for the supercapacitor of the present experiment has rapid current response, and the charging/discharging of the electrode can be accomplished by a constant rate concerning the whole cycle.

Figure 8:
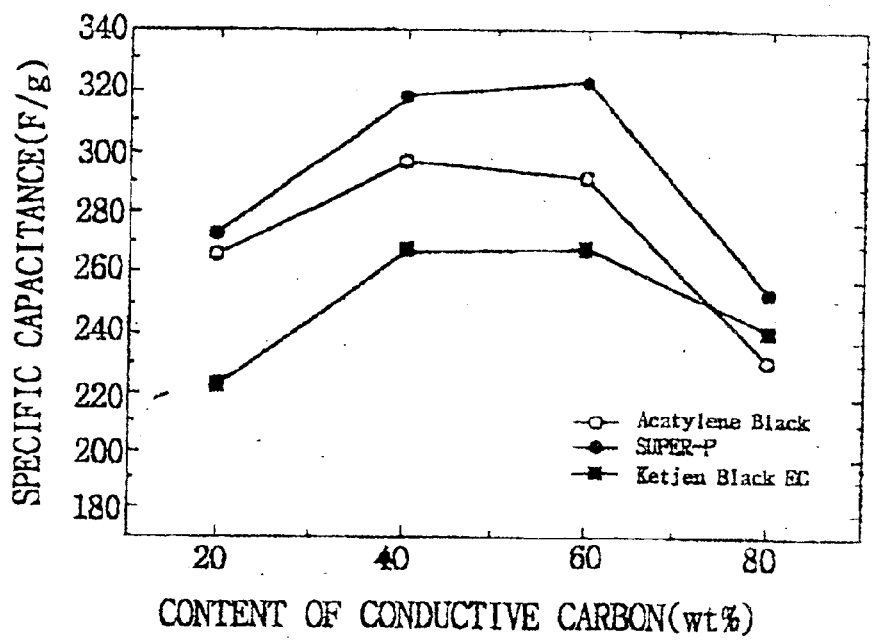
FIG. 8 is a graph illustrating variations of specific capacitances of the electrodes and amount of the conductive carbon in the electrodes at a constant voltage scanning speed of 20 mV/sec according to the first, second and third experiments of the present invention.

FIG. 8 is a graph illustrating the variations of specific capacitances of the electrodes and the amount of the conductive carbon in the electrodes according to experiments 1, 2 and 3 of the present invention. At that time, the variations of the specific capacitances according to the type of conductive carbon were measured at constant voltage scanning speed of 20 mV/sec. The specific capacitance mean standardized values are obtained by dividing measured capacitance by weights of the manganese oxide coated on the conductive carbon.

Referring to FIG. 8, the specific capacitances of the electrodes have excellent values from approximately 250 to 325 F/g when the conductive carbon is SUPER-P. Particularly, when the electrodes respectively include 40 wt % and 60 wt % of the conductive carbon, the specific capacitances of the electrodes show the best values of approximately 320 F/g and 325 F/g.

Figure 9:
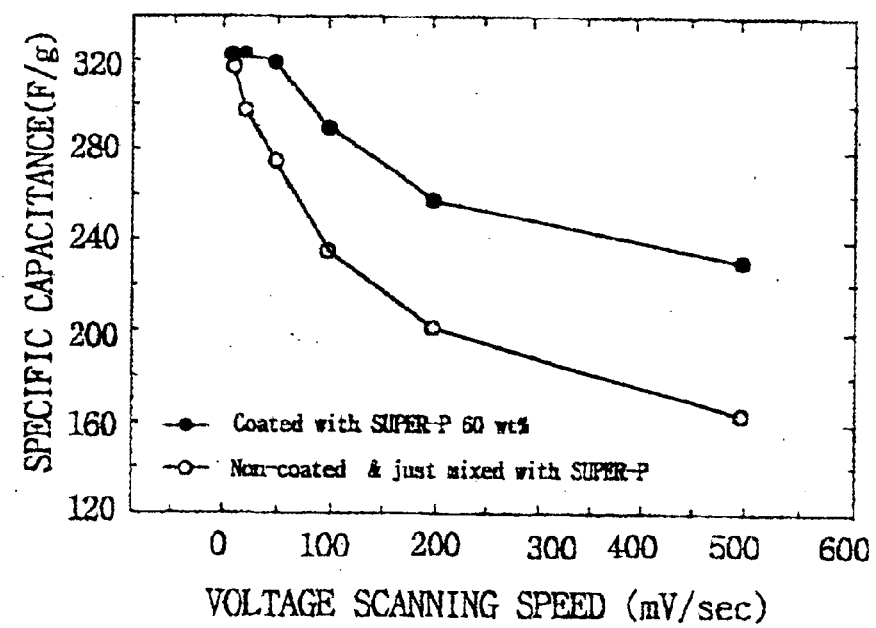
FIG. 9 is a graph illustrating variations of specific capacitances of the conventional electrode and an electrode of the first experiment of the present invention.

FIG. 9 is a graph illustrating variations of specific capacitances of a conventional electrode and an electrode of experiment 1 of the present invention. The specific capacitances are measured by changing the voltage scanning speed. In the electrode of experiment 1, the conductive carbon is SUPER-P, and the electrode includes 60 wt % of the conductive carbon on which manganese oxide is coated; however, the conventional electrode is prepared by physically mixing the conductive carbon with the manganese oxide.

As shown in FIG. 9, the electrode of experiment 1 has a specific capacitance higher than that of the conventional electrode.

Figure 10:
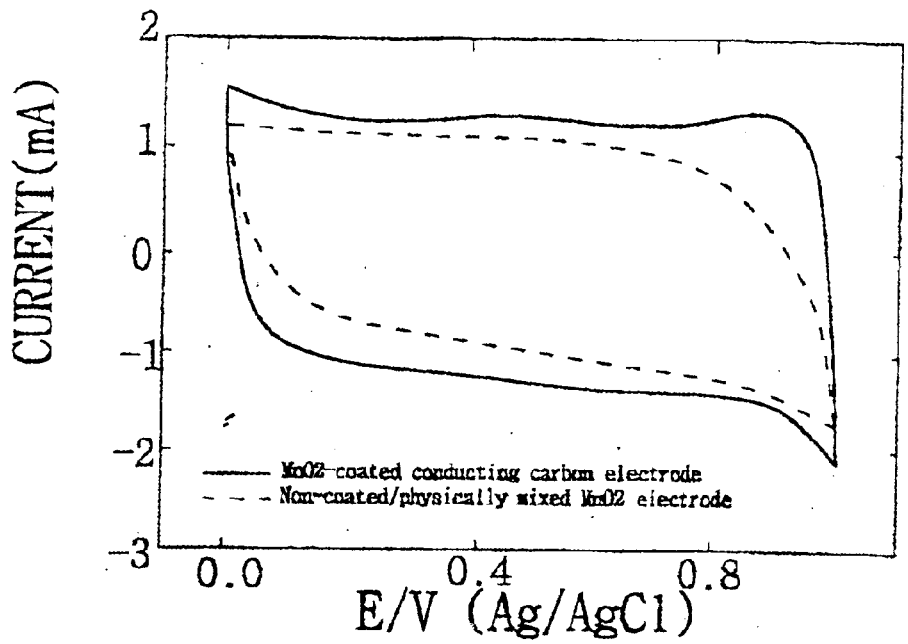
FIG. 10 is a graph illustrating the cyclic voltammograms of the conventional electrodes and the electrodes of the first experiment of the present invention at a constant voltage speed of 20 mV/sec.

FIG. 10 is a graph illustrating cyclic voltammograms of conventional electrodes and the electrodes of experiment 1 of the present invention at a constant voltage speed of 20 mV/sec. That is, the electrode of experiment 1 includes 60 wt % of SUPER-P as the conductive carbon on which the manganese oxide is coated, while the conventional electrode is prepared by physically mixing conductive carbon with manganese oxide.

Referring to FIG. 10, the electrode of the experiment 1 has high current response at both end points of the voltage. Hence, the electrode of experiment 1 is greatly suitable for a supercapacitor.

Figure 11:
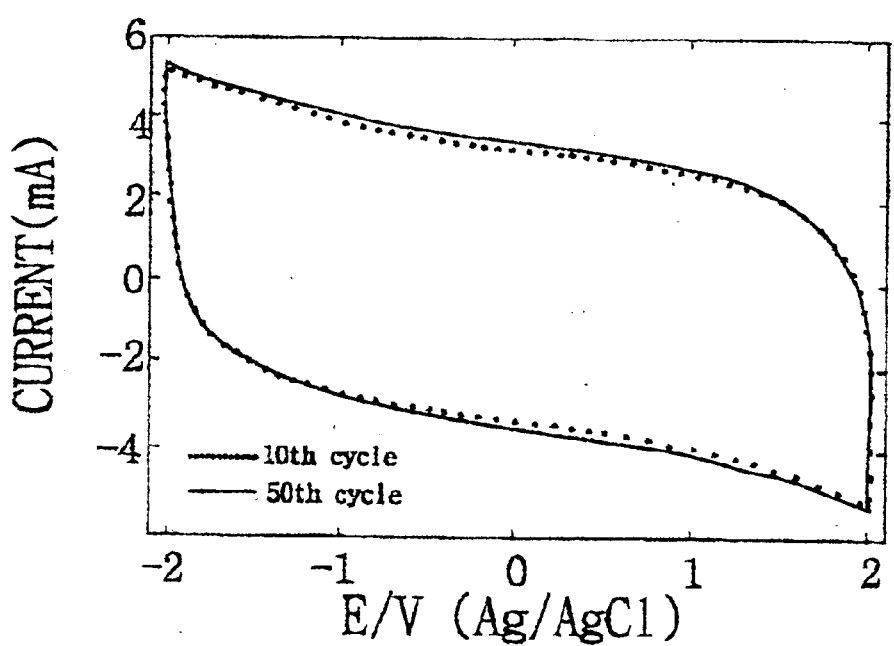
FIG. 11 is a graph illustrating a test result of the electrode of the first experiment as the electrode for the supercapacitor.

FIG. 11 is a graph illustrating a test result of the electrode of experiment 1 as the electrode for the supercapacitor. The electrode comprises 60 wt % of SUPER-P as the conductive carbon on which manganese oxide is coated.

Referring to FIG. 11, the electrode of the present invention shows excellent capacitance for the supercapacitor since the electrode is not deteriorated after fifty cycles.

Experiment 4

After an activated carbon powder was added to 60 ml of deionized water, the activated carbon powder was sufficiently dispersed and wetted in the deionized water by stirring the deionized water, including the activated carbon, to form an activated carbon solution. The activated carbon has a specific surface area of 1500 $m^2/g$. In this case, the amount of the activated carbon was 20 wt %, 40 wt %, 60 wt % and 80 wt %, respectively. The amount of the activated carbon was evaluated on grounds of the total amount of the manganese oxide powder produced by mixing the potassium permanganate with manganese acetate during the subsequent steps.

Subsequently, a permanganate solution was prepared by adding 1.58 g of potassium permanganate to the activated carbon solution. The permanganate solution was stirred for 1 hour so that the potassium permanganate was sufficiently absorbed on the activated carbon. When the potassium permanganate was added to the activated carbon solution, the color of the permanganate solution was deep violet. However, the color of the permanganate solution became transparent when the permanganate solution was stirred since the potassium permanganate was absorbed in pores of the activated carbon and on the surface of the activated carbon having strong absorbability.

In the meantime, manganese acetate solution was prepared by adding 3.68 g of manganese acetate to 100 ml of deionized water.

The manganese acetate solution was mixed with the permanganate solution to form a mixed solution, and then the mixed solution was violently stirred. When the manganese acetate solution is mixed with the permanganate solution, a reaction rapidly proceeds with the formation of amorphous manganese oxide, so the color of the mixed solution quickly changes to brown, which is the color of the amorphous manganese oxide, and the viscosity of the mixed solution rapidly increases. Thus, the mixed solution was stirred for 12 hours in order to sufficiently execute the formation reaction of the amorphous manganese oxide in the present experiment.

After the mixed solution including the amorphous manganese oxide was filtered several times with a ceramic filter, thereby obtaining an amorphous manganese oxide powder, the amorphous manganese oxide powder was washed with deionized water.

Then, the amorphous manganese oxide powder was sufficiently dried in a dryer at a temperature of 120° C. After the sufficiently dried amorphous manganese oxide powder was ground, a mixture was formed by mixing 5 wt % of binder with the ground amorphous manganese oxide powder. In this case, the binder was PTFE. Subsequently, sheet-shaped electrodes were cut to form pellet-shaped electrodes after the sheet-shaped electrodes were formed by rolling the mixture. Finally, manganese oxide electrodes for a supercapacitor were manufactured by cold drawing the pellet shaped electrodes on current collectors.

Experiment 5

In the present experiment, electrodes for the supercapacitor were manufactured by the method of experiment 4 except for the type of activated carbon and the amount of the activated carbon in the electrodes for the supercapacitor.

According to the present experiment, the activated carbon had a specific surface area of 2000 $m^2/g$ and the amount of the activated carbon in the electrodes was 20 wt %, 40 wt %, 60 wt % and 80 wt %, respectively.

The amorphous manganese oxide of the present experiment was analyzed by X-ray diffraction analysis so as to evaluate the characteristics of the amorphous manganese oxide.

Figure 12:
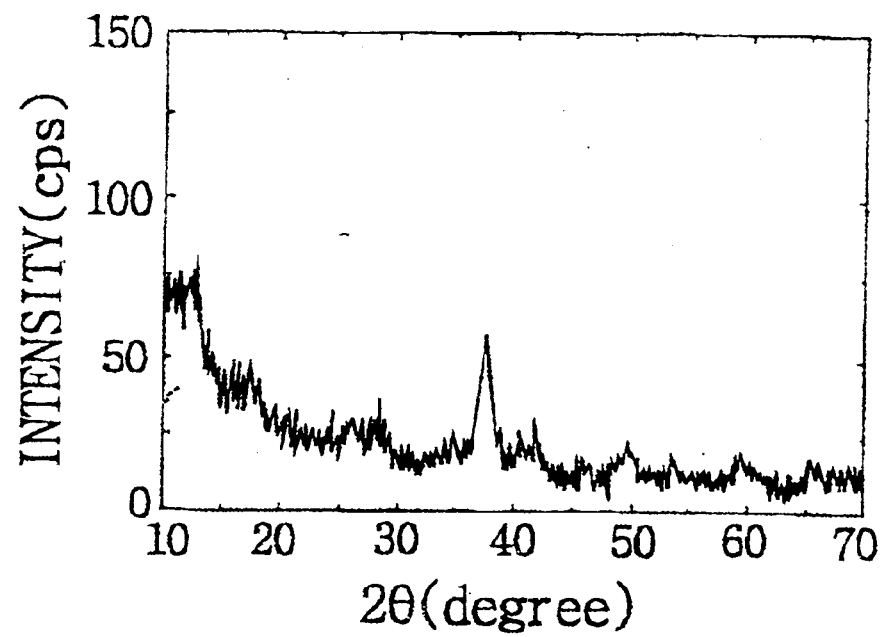
FIG. 12 is a graph showing the X-ray diffraction analysis of amorphous manganese oxide according to the fifth experiment of the present invention.

FIG. 12 is a graph showing the X-ray diffraction analysis of the amorphous manganese oxide of the present experiment. The amorphous manganese oxide was manufactured by adding 40 wt % of the activated carbon.

Referring to FIG. 12, the amorphous manganese oxide of the present experiment is nearly entirely in the amorphous phase in comparison with conventional manganese oxide, even though the amorphous manganese oxide has a little crystal phase material.

In general, the performance test for the electrode is accomplished in a beaker-type electrochemical cell having a working electrode, a platinum gauze and a standard calomel reference electrode (SCE) therein. The surface area of the working electrode is about 0.25 $m^2$, and a 2 M potassium chloride (KCl) solution having a hydrogen ion exponent of about 6.7 is used as electrolyte.

Figure 13:
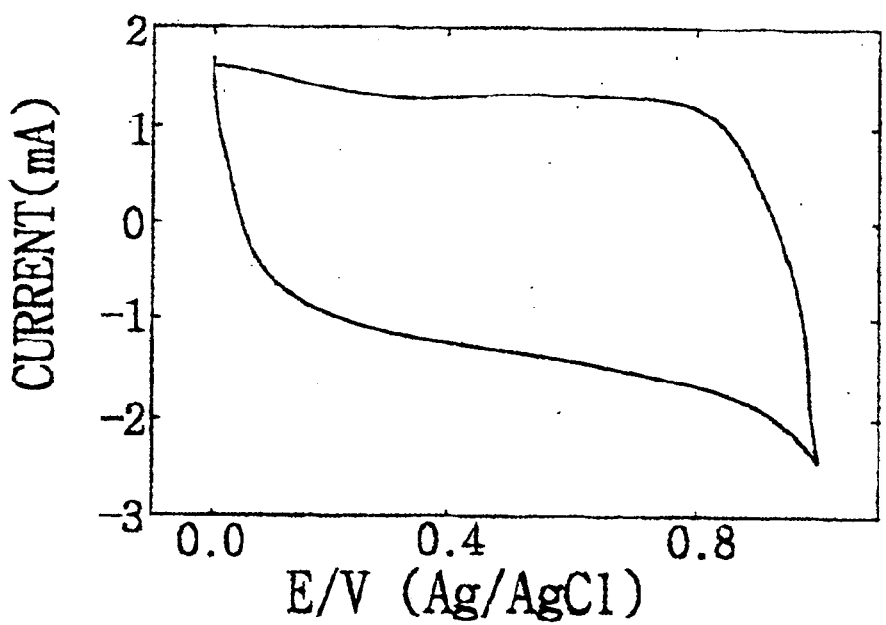
FIG. 13 is a graph illustrating cyclic voltammogram of the electrode for the supercapacitor according to the fifth experiment of the present invention.
Figure 14A:
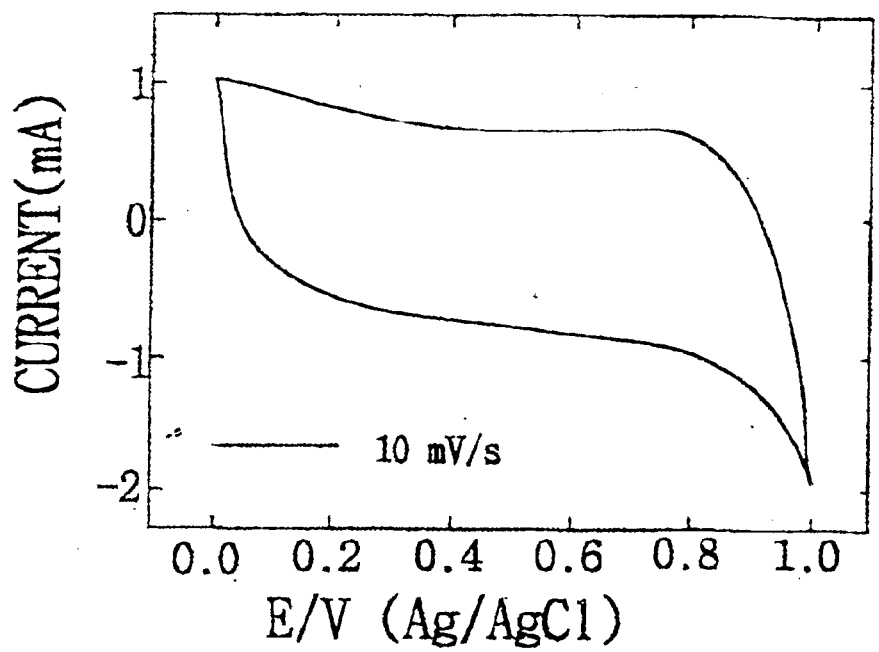
FIG. 14A to FIG. 14F are graphs showing cyclic voltammograms of the electrode for the supercapacitor according to the fifth experiment of the present invention.
Figure 14B:
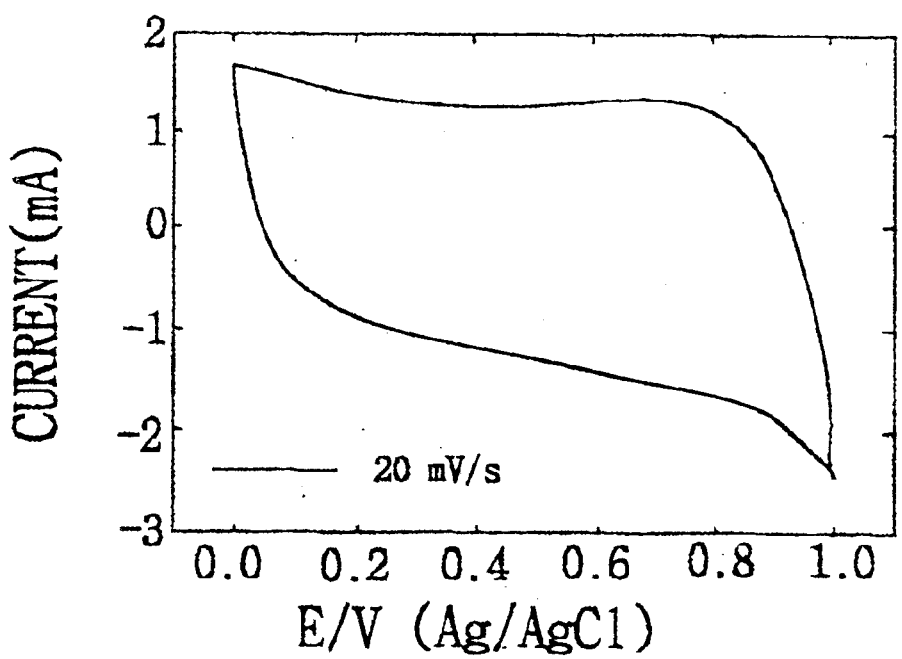
Figure 14C:
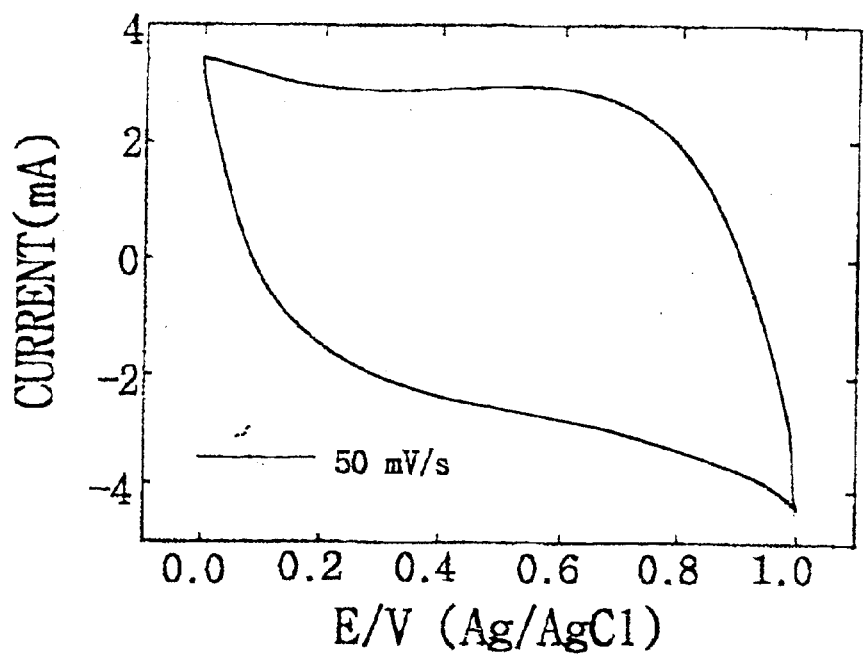
Figure 14D:
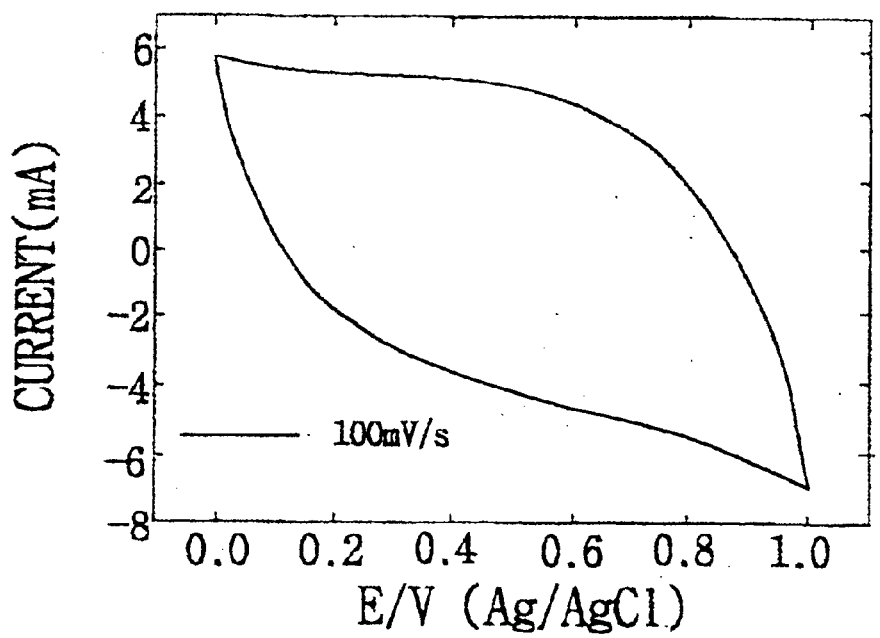
Figure 14E:
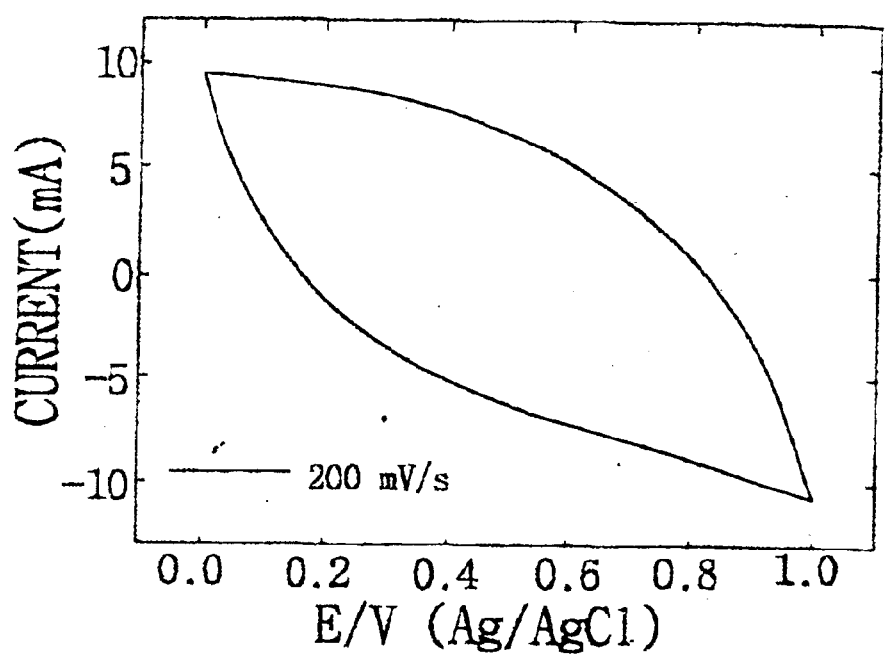
Figure 14F:
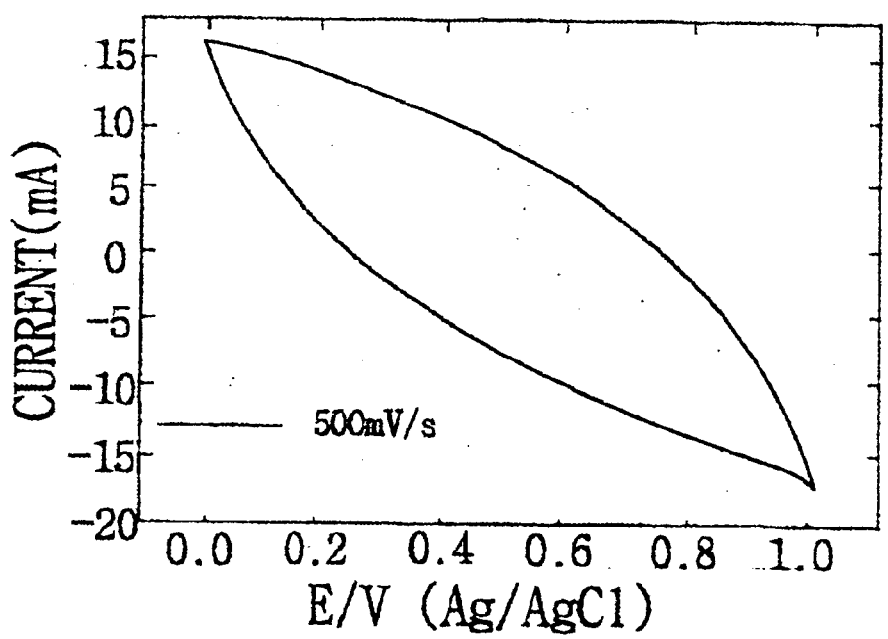

FIG. 13 is a graph illustrating cyclic voltammogram of the electrode for the supercapacitor according to the present experiment. In FIG. 13, the cyclic voltammogram of the electrode is measured at a voltage scanning speed of 20 mV/sec, and the electrode includes 40 wt % of activated carbon.

As shown in FIG. 13, the electrode for the supercapacitor of the present experiment has high current response and the charging/discharging of the electrode can be accomplished by a constant rate concerning the whole cycle.

FIG. 14A to FIG. 14F are graphs showing cyclic voltammograms of the electrode of the present experiment. In FIGS. 14A to 14F, the cyclic voltammograms of the electrode for the supercapacitor were measured by changing voltage scanning speeds and the electrode includes 40% by weight of activated carbon.

Referring to FIGS. 14A to 14F, the electrode of the present experiment shows the best property for the supercapacitor when the voltage scanning speed is 20 mV/sec.

Figure 15:
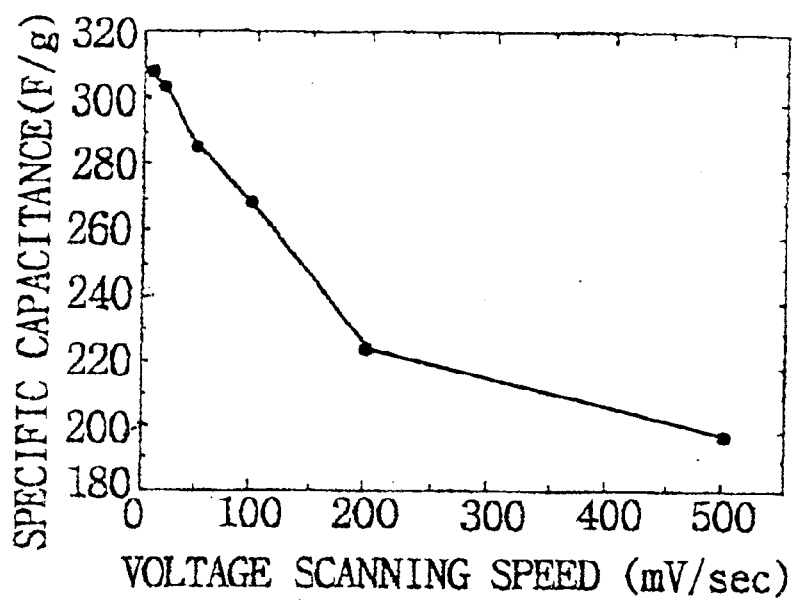
FIG. 15 is a graph illustrating variation of unit capacitance of the electrode for the supercapacitor according to the fifth experiment of the present invention.

FIG. 15 is a graph illustrating variation of specific capacitance of the electrode of the present experiment. In this case, the specific capacitance is measured by changing the voltage scanning speed and the specific capacitance means standardized value obtained by dividing a measured capacitance by weights of the manganese oxide coated on the activated carbon.

As shown in FIG. 15, the specific capacitance of the electrode decreases as the voltage scanning speed increases. In particular, the specific capacitance of the electrode is more than approximately 300 F/g when the voltage scanning speed is 10 to 20 mV/sec.

Experiment 6

As for the present experiment, electrodes for the supercapacitor were manufactured by the method of experiment 4 except for the type of activated carbon and the amount of the activated carbon in the electrodes for the supercapacitor.

In the present experiment, the activated carbon had a specific surface area of 2500 $m^2/g$ and the amount of the activated carbon in the electrodes was 20 wt %, 40 wt %, 60 wt % and 80 wt %, respectively.

Experiment 7

In the present experiment, electrodes for the supercapacitor were manufactured by the method of experiment 4 except for the type of activated carbon and the amount of activated carbon in the electrodes for the supercapacitor.

According to the present experiment, the activated carbon had a specific surface area of 3000 $m^2/g$, and the amount of the activated carbon in the electrodes was 20 wt %, 40 wt %, 60 wt % and 80 wt %, respectively.

Figure 16:
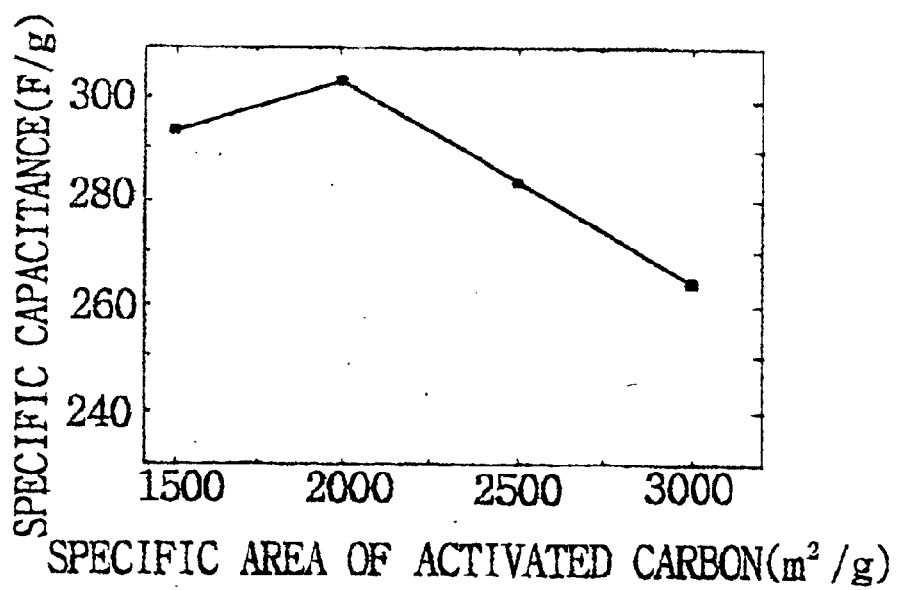
FIG. 16 is a graph showing specific capacitances of the electrodes for the supercapacitor according to the fourth, fifth, sixth and seventh experiments of the present invention.

FIG. 16 is a graph showing specific capacitances of the electrodes for the supercapacitor according to experiments 4, 5, 6 and 7. In this case, the electrodes respectively comprise 40 wt % of activated carbon.

Referring to FIG. 16, the electrode including the activated carbon having the specific surface area of 2000 $m^2/g$ shows the largest specific capacitance according to experiment 5.

Figure 17:
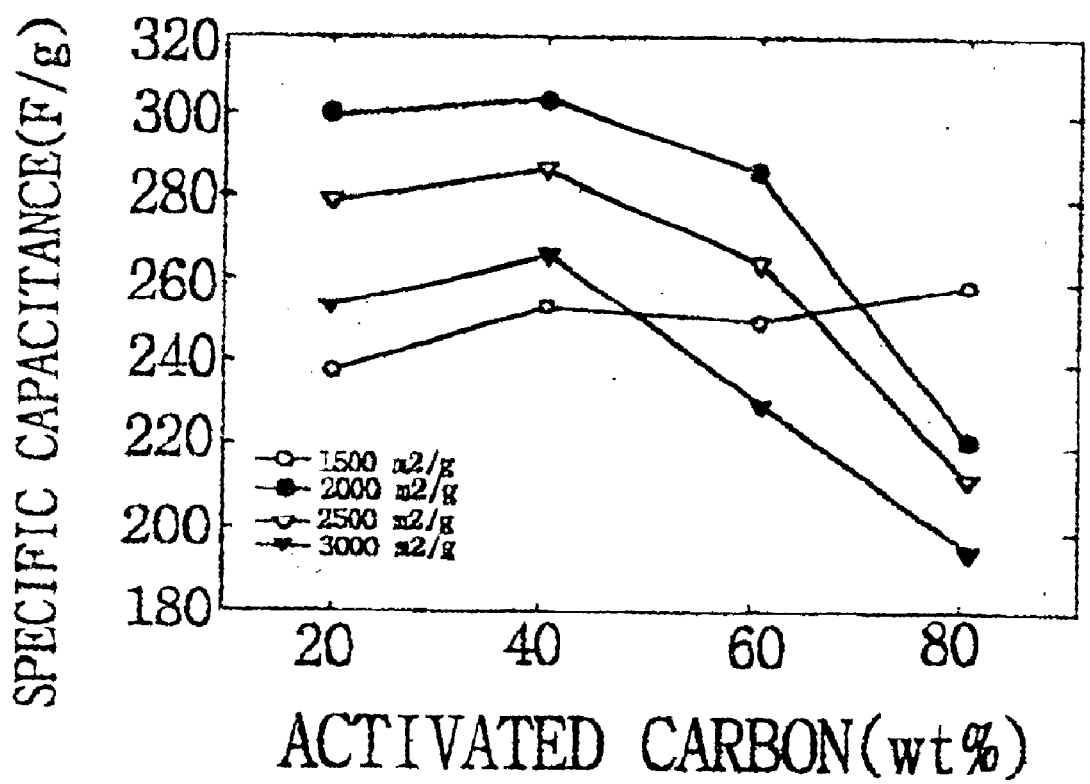
FIG. 17 is a graph showing specific capacitances of electrodes having different amount of activated carbon according to the fourth, fifth, sixth and seventh experiments of the present invention.

FIG. 17 is a graph showing specific capacitances of electrodes having different amount of activated carbon according to experiments 4, 5, 6 and 7. At that time, the electrodes respectively comprise 20 wt %, 40 wt %, 60 wt % and 80 wt % of activated carbon.

Referring to FIG. 17, the electrode including 40 wt % of activated carbon having the specific surface area of 2000 $m^2/g$ shows the best specific capacitance.

Experiment 8

After potassium permanganate powder was formed by grinding potassium permanganate to have fine particles, the potassium permanganate powder was inserted into a furnace previously heated to a temperature of 500° C. Then, the potassium permanganate powder was thermally decomposed for 2 hours, thereby obtaining a manganese oxide powder.

After the manganese oxide powder was rapidly cooled (that is, quenched) below room temperature by using distilled water, it was washed with distilled water, filtered and dried in a dryer.

The dried manganese oxide powder was mixed with conductive carbon and binder to form slurry for an electrode. In this case, the slurry comprises 90 wt % of the manganese oxide powder, 5 wt % of the conductive carbon and 5 wt % of the binder.

Then, the electrode for the supercapacitor was manufactured by coating the slurry on a current collector.

Experiment 9

As for the present experiment, the electrode for the supercapacitor was manufactured by the method of experiment 8 except for the composition of the electrode. In the present experiment, the electrode comprises 80 wt % of manganese oxide powder, 15 wt % of conductive carbon and 5 wt % of binder.

Experiment 10

According to the present experiment, the electrode for the supercapacitor was manufactured by the method of experiment 8 except for the composition of the electrode. In the present experiment, the electrode comprises 70 wt % of manganese oxide powder, 25 wt % of conductive carbon and 5 wt % of binder.

Experiment 11

In the present experiment, the electrode for the supercapacitor was manufactured by the method of experiment 8 except for the composition of the electrode. According to the present experiment, the electrode comprises 60 wt % of manganese oxide powder, 35 wt % of conductive carbon and 5 wt % of binder.

Experiment 12

In the present experiment, the electrode for the supercapacitor was obtained by the method of the experiment 8 except for the composition of the electrode. According to the present experiment, the electrode comprises 50 wt % of manganese oxide powder, 45 wt % of conductive carbon and 5 wt % of binder.

Experiment 13

As for the present experiment, the electrode for the supercapacitor was obtained by the method of experiment 8 except for the composition of the electrode. According to the present experiment, the electrode comprises 60 wt % of manganese oxide powder, 30 wt % of conductive carbon and 10 wt % of binder.

Experiment 14

According to the present experiment, the electrode for the supercapacitor was obtained by the method of experiment 8 except for the composition of the electrode. In the present experiment, the electrode comprises 60 wt % of manganese oxide powder, 25 wt % of conductive carbon and 15 wt % of binder.

Experiment 15

In the present experiment, the electrode for the supercapacitor was obtained by the method of experiment 8 except for the composition of the electrode. According to the present experiment, the electrode comprises 60 wt % of manganese oxide powder, 20 wt % of conductive carbon and 20 wt % of binder.

Experiment 16

As for the present experiment, the electrode for the supercapacitor was obtained by the method of experiment 8 except for the composition of the electrode. According to the present experiment, the electrode comprises 50 wt % of manganese oxide powder, 20 wt % of conductive carbon and 30 wt % of binder.

Experiment 17

In the present experiment, the electrode for the supercapacitor was obtained by the method of experiment 8 except for the composition of the electrode. According to the present experiment the electrode comprises 30 wt % of manganese oxide powder, 20 wt % of conductive carbon and 50 wt % of binder.

Evaluation of the Electrodes Manufactured According to Experiments 8 to 17

The capacitances and the ESR of the electrodes according to experiments 8 to 17 are measured as shown in Table 1. In Table 1, the ESR is measured concerning capacitors of 2V and 500 mF.

TABLE 1

| Experiment | specific capacitance (F/g) | ESR of 2 V, 500 mF capacitor ($\Omega$) |
| --- | --- | --- |
| Experiment 8 | 264.2 | 1.768 |
| Experiment 9 | 294.3 | 0.780 |
| Experiment 10 | 302.9 | 0.452 |
| Experiment 11 | 311.1 | 0.329 |
| Experiment 12 | 326.4 | 0.204 |
| Experiment 13 | 327.5 | 0.174 |
| Experiment 14 | 312.8 | 0.128 |
| Experiment 15 | 331.4 | 0.121 |
| Experiment 16 | 294.6 | 0.153 |
| Experiment 17 | 231.3 | 12.433 |

Figure 18:
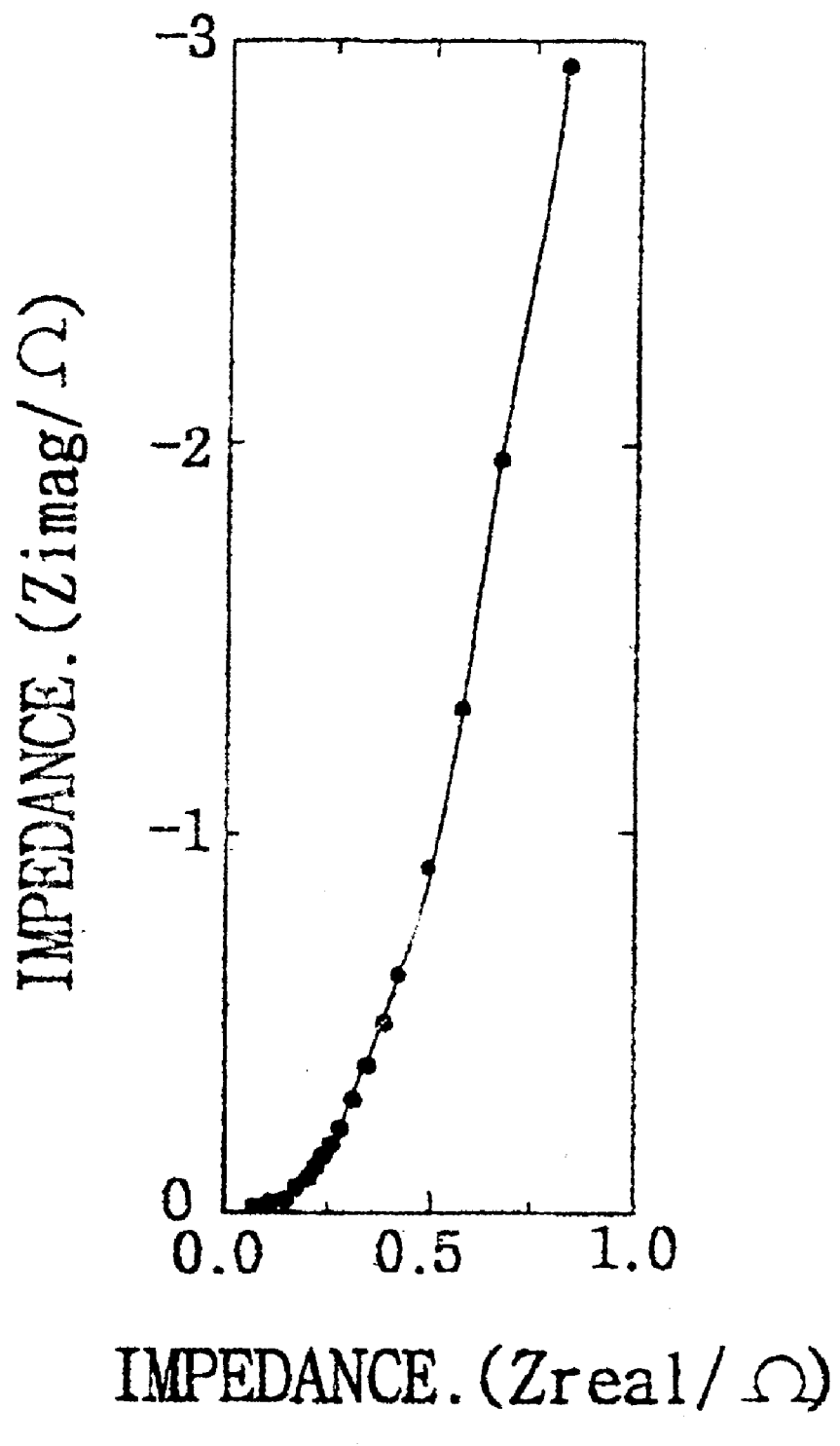
FIG. 18 is a graph showing an alternating current impedance of a 2V capacitor manufactured by using the electrode according to the fifteenth experiment of the present invention.
Figure 19:
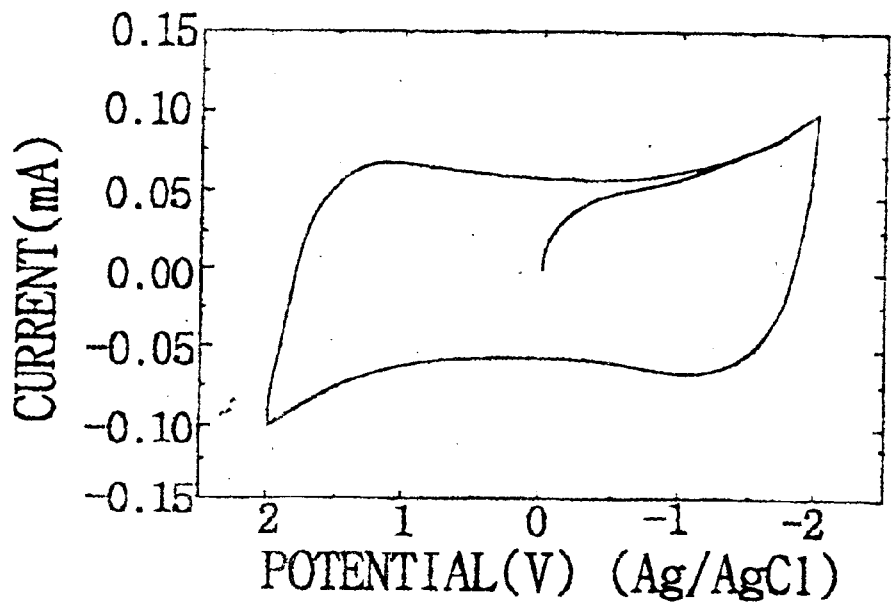
FIG. 19 is a graph showing the cyclic voltammogram of the 2V capacitor in FIG. 18.

FIG. 18 is a graph showing an alternating current impedance of a 2V capacitor manufactured by using the electrode of experiment 15, and FIG. 19 is a graph showing the CV of the 2V capacitor in FIG. 18. In this case, the capacitor has a capacitance of 500 mF.

Referring to FIGS. 18 and 19, the electrodes of the present invention have excellent properties for the supercapacitor.

Figure 20:
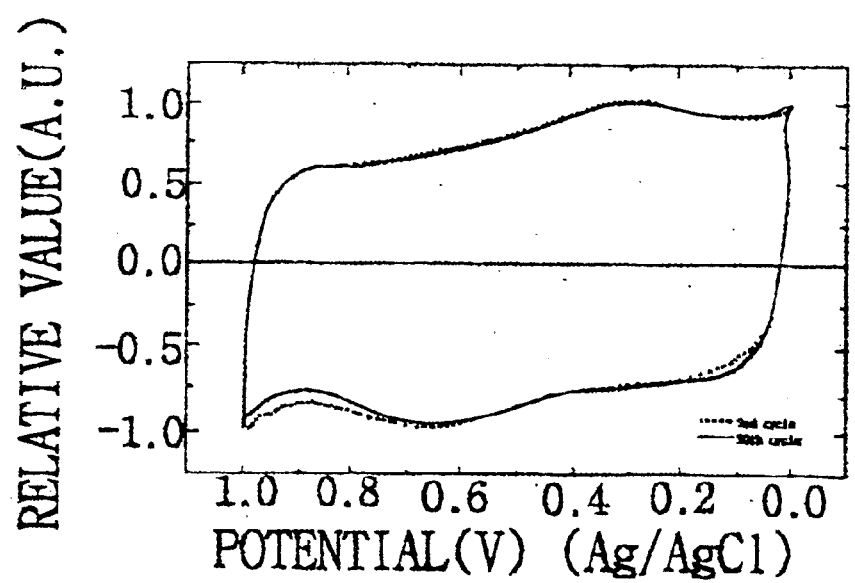
FIG. 20 is a graph illustrating performance tests for the electrode according to the fifteenth experiment of the present invention.
Figure 21A:
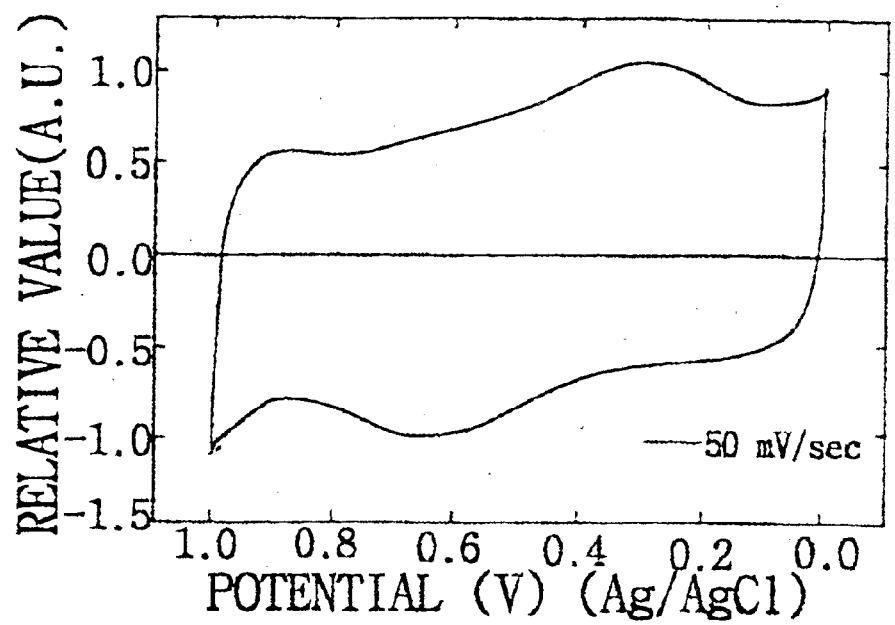
FIG. 21A to FIG. 21D are graphs showing cyclic voltammograms of the electrode according to the fifteenth experiment of the present invention.
Figure 21B:
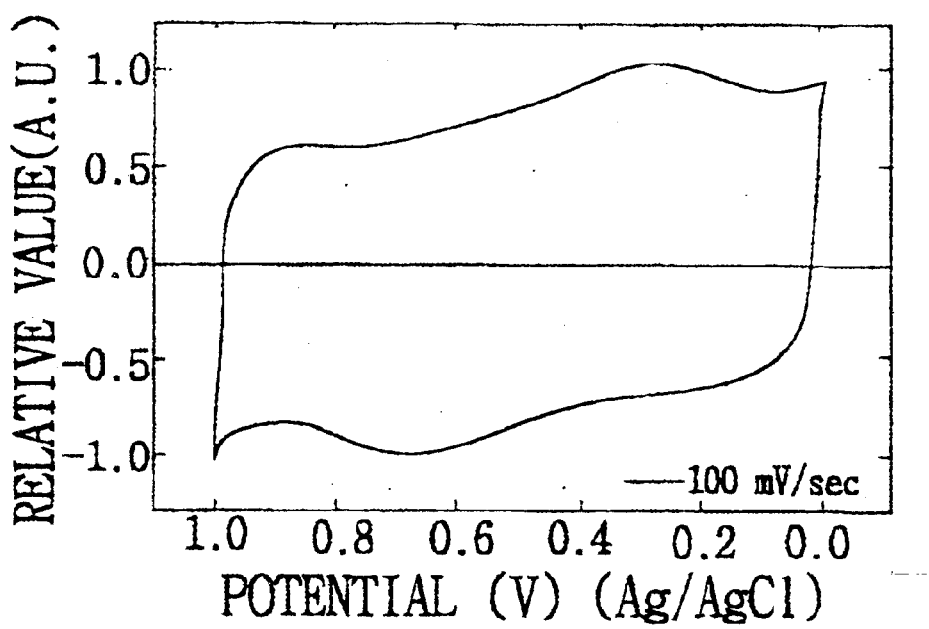
Figure 21C:
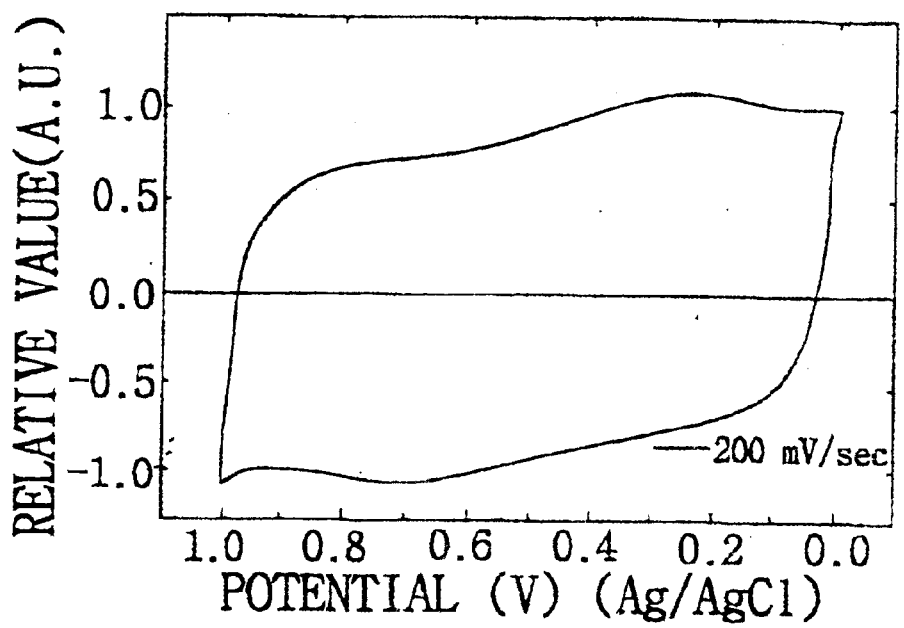
Figure 21D:
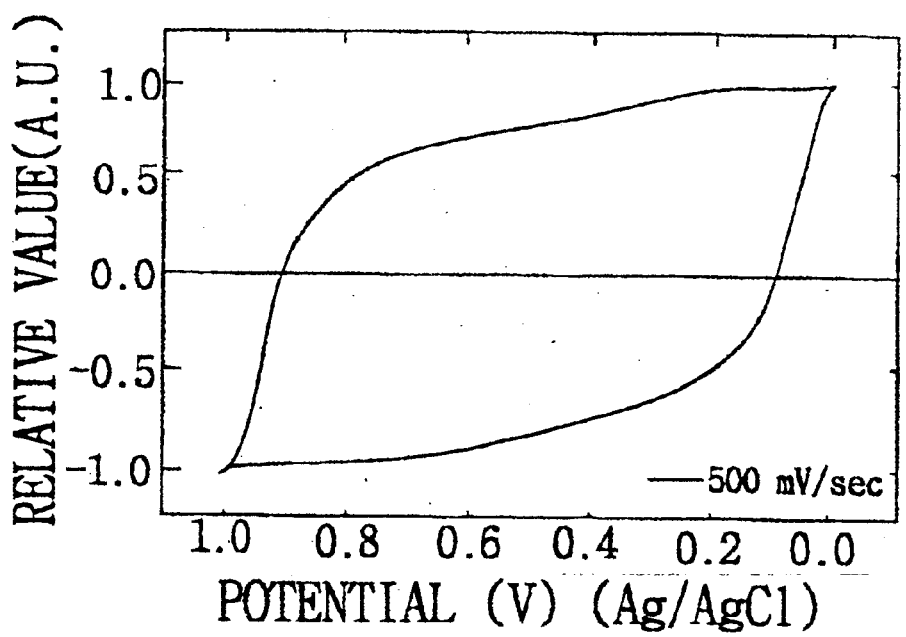

FIG. 20 is a graph illustrating a performance test for the electrode of experiment 15 through continuous tests repeated twice and twenty times so as to evaluate the cyclability of the electrode. In FIG. 20, dotted and solid lines, respectively, represent the continuous tests repeated twice and twenty times.

As shown in FIG. 20, the electrode of experiment 15 maintains good characteristics for the supercapacitor after the continuous tests were repeated twenty times.

FIG. 21A to FIG. 21D are graphs showing the cyclic voltammograms of the electrode of experiment 15. The cyclic voltammograms were measured by changing the voltage scanning speed.

Referring to FIGS. 21A to 21D, the capacitance of the electrode of experiment 15 may not be affected by the voltage scanning speed, and the electrode has the best capacitance when the voltage scanning speed is 100 mV/sec.

According to the present invention, the loading amount of manganese oxide on the conductive carbon greatly increases and the degree of dispersion of the manganese oxide is much enhanced in comparison with the physically mixed manganese oxide with conductive carbon. Therefore, the electrode for the supercapacitor of the present invention can reduce the ESR and enhance the high frequency characteristics because the contact area and the adhesion strength between the manganese oxide and the conductive carbon are improved.

Also, the electrode of the present invention has a high capacitance suitable for a supercapacitor as compared with a conventional electrode because the electrode is manufactured by mixing amorphous manganese oxide powder with conductive material and binder.

Furthermore, the electrode of the present invention can be manufactured at a cost of one percent of that of the ruthenium oxide electrode, even though the electrode of the present invention has good capacitance which is nearly equal to half the capacitance of the ruthenium oxide electrode, which has the highest capacitance among conventional electrodes.

Although the preferred embodiments of the invention have been described, it is understood that the present invention should not be limited to those preferred embodiments, but various changes and modifications can be made by one skilled in the art within the spirit and scope of the invention as hereinafter claimed.

What is claimed is:

1. A method for manufacturing a metal oxide electrode for a supercapacitor comprising the steps of:
   forming a conductive material solution by dispersing a conductive material in deionized water;
   forming a first solution by adding potassium permanganate to the conductive material solution;
   forming a second solution comprising a manganese acetate;
   forming an amorphous manganese oxide by mixing the first solution with the second solution; and
   forming the metal oxide electrode comprising said amorphous manganese oxide.

2. The method for manufacturing a metal oxide electrode for a supercapacitor as claimed in claim 1, wherein said conductive material is composed of a material having electrical conductivity such as a metal oxide, a metal nitride, a metal carbide, a metal powder or a conducting polymer.

3. The method for manufacturing a metal oxide electrode for a supercapacitor as claimed in claim 1, wherein said step of forming the conductive material solution is performed after dissolving a surfactant in the deionized water.

4. The method for manufacturing a metal oxide electrode for a supercapacitor as claimed in claim 3, wherein the surfactant comprises polyvinylpyrrolidone.

5. The method for manufacturing a metal oxide electrode for a supercapacitor as claimed in claim 1, wherein the conductive material is carbon or activated carbon.

6. The method for manufacturing a metal oxide electrode for a supercapacitor as claimed in claim 1, wherein the first solution is a potassium permanganate solution wherein the potassium permanganate is absorbed on the conductive material.

7. The method for manufacturing a metal oxide electrode for a supercapacitor as claimed in claim 1, wherein said step of forming the metal oxide electrode further comprises:
   extracting an amorphous manganese oxide powder from the first solution and the second solution;
   grinding the amorphous manganese oxide powder;
   forming a mixture by adding a binder to the ground amorphous manganese oxide powder; and
   forming an electrode having a predetermined shape by using the mixture.

8. The method for manufacturing a metal oxide electrode for a supercapacitor as claimed in claim 7, said step of extracting the amorphous manganese oxide powder further comprises:
   filtering the amorphous manganese oxide powder from a mixture of the first solution and the second solution;
   washing the filtered amorphous manganese oxide powder; and
   drying the washed amorphous manganese oxide powder.

9. The method for manufacturing a metal oxide electrode for a supercapacitor as claimed in claim 7, wherein the binder is composed of a polytetrafluoroethylene.

10. A method for manufacturing a metal oxide electrode for a supercapacitor comprising the steps of:
    grinding potassium permanganate;
    heating a furnace to a predetermined temperature;
    thermally decomposing the ground potassium permanganate in the furnace;
    quenching the product;
    washing and filtering the product; and
    mixing the product with a conductive material, a binder and a solution.

11. The method for manufacturing a metal oxide electrode for a supercapacitor as claimed in claim 10, wherein the furnace is heated to a temperature of about 450 to about 550° C.

12. The method for manufacturing a metal oxide electrode for a supercapacitor as claimed in claim 10, wherein said step of thermally decomposing the ground potassium permanganate is performed to form a manganese oxide having a layer structure and comprising potassium ions.

13. The method for manufacturing a metal oxide electrode for a supercapacitor as claimed in claim 10, wherein said step of quenching the product is performed by rapidly cooling the product below a room temperature.

14. The method for manufacturing a metal oxide electrode for a supercapacitor as claimed in claim 10, wherein the conductive material is composed of a material having electrical conductivity such as a metal oxide, a metal nitride, a metal carbide, a metal powder or a conducting polymer.

15. The method for manufacturing a metal oxide electrode for a supercapacitor as claimed in claim 10, wherein the conductive material is a conductive carbon and the binder is a polytetraflouroethylene.

* * * * *